US006975075B2

(12) United States Patent
Sagawa et al.

(10) Patent No.: US 6,975,075 B2
(45) Date of Patent: Dec. 13, 2005

(54) FIELD EMISSION DISPLAY

(75) Inventors: Masakazu Sagawa, Inagi (JP); Mutsumi Suzuki, Kodaira (JP); Toshiaki Kusunoki, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/004,868

(22) Filed: Dec. 7, 2004

(65) Prior Publication Data
US 2005/0094429 A1 May 5, 2005

Related U.S. Application Data

(63) Continuation of application No. 10/349,995, filed on Jan. 24, 2003, now Pat. No. 6,873,115.

(30) Foreign Application Priority Data

Jul. 25, 2002 (JP) ............................. 2002-216227

(51) Int. Cl.[7] .............................................. G09G 3/10
(52) U.S. Cl. ................... 315/169.1; 313/306; 313/506
(58) Field of Search ............. 315/169.1; 313/495–497, 313/505–506, 243, 292, 306, 310–311

(56) References Cited

U.S. PATENT DOCUMENTS

| 5,598,056 A | 1/1997 | Jin et al. ............... 313/495 |
| 5,690,530 A | 11/1997 | Jin et al. ............... 445/24 |
| 5,932,963 A | 8/1999 | Nakamura et al. ....... 313/495 |
| 5,936,257 A | 8/1999 | Kusunoki et al. ........ 257/10 |
| 6,084,339 A | 7/2000 | Xie et al. ............... 313/310 |
| 6,144,166 A | 11/2000 | Nakamura et al. ...... 315/169.3 |
| 6,555,957 B1 * | 4/2003 | Nomura et al. ......... 313/495 |
| 6,617,774 B1 | 9/2003 | Kusunoki et al. ........ 313/311 |
| 6,683,408 B2 * | 1/2004 | Ichikawa ................ 313/495 |
| 2002/0041163 A1 * | 4/2002 | Ichikawa ............... 315/169.1 |

FOREIGN PATENT DOCUMENTS

| JP | 7-201277 | 8/1995 |
| JP | 7-272616 | 10/1995 |
| JP | 7-320630 | 12/1995 |
| JP | 8-329835 | 12/1996 |
| JP | 10-153979 | 9/1998 |
| JP | 11-120898 | 4/1999 |
| JP | 2000-285801 | 10/2000 |

(Continued)

OTHER PUBLICATIONS

Yamaguchi, E., et al "A 10-in. Surface-Condition Electron-Emitter Display"; Journal of the SID, May 4, 1997; pp. 345-348.

*Primary Examiner*—Thuy Vinh Tran
(74) *Attorney, Agent, or Firm*—Antonelli, Terry, Stout and Kraus, LLP.

(57) ABSTRACT

A display having hot electron type electron sources displaying an image by a line sequential scanning scheme is provided to prevent poor brightness uniformity along scan lines. The hot electron type electron source is provided with a top electrode bus line serving as a scan line and a bottom electrode bus line serving as a data line. The top electrode bus line has a sheet resistance lower than that of the bottom electrode. The wire sheet resistance of the scam line can be reduced to several m/square. When forming a 40 inch large screen FED using the hot electron type electron sources, a voltage drop amount produced in the scan line can be suppressed below an allowable range. As a result, high quality image without poor brightness uniformity can be obtained.

12 Claims, 41 Drawing Sheets

FOREIGN PATENT DOCUMENTS

| | | |
|---|---|---|
| JP | 2001-35357 | 2/2001 |
| JP | 2001-101695 | 4/2001 |
| JP | 2001-256907 | 9/2001 |
| WO | WO 01/026128 | 4/2001 |

* cited by examiner

FIELD EMISSION DISPLAY

CROSS-REFERENCE TO RELATED APPLICATIONS

This application is a continuation of application Ser. No. 10/349,995 filed on Jan. 24, 2003 which is now U.S. Pat. No. 6,873,115. The contents of application Ser. No. 10/349,995 are hereby incorporated herein by reference in their entirety.

BACKGROUND OF THE INVENTION

1. Field of the Invention

The present invention relates to a display using cold cathode electron sources. More specifically, the present invention relates to a display suitable for an emissive type flat panel display using hot electron type electron sources.

2. Description of the Related Art

A display using cold cathode electron sources which are micro and can be integrated is called an FED (Field Emission Display). The cold cathode electron source is broadly divided into a field emission electron source and a hot electron type electron source. The former includes a spindt type electron source, a surface conduction type electron source and a carbon nano-tube type electron source. The latter includes an MIM (Metal-Insulator-Metal) type electron source stacked with metal-insulator-metal and an MIS (Metal-Insulator-Semiconductor) type electron source stacked with metal-insulator-semiconductor.

The MIM type electron source is disclosed in Japanese Patent Application Laid-Open No. 10-153979. The MIM type electron source will be described using FIGS. 1 and 2 schematically showing its structure and operating principle.

A driving voltage Vd is applied between a top electrode 13 and a bottom electrode 11 so that an electric field in an insulator 12 is about 1–10 MV/cm. Electrons near the Fermi level in the bottom electrode 11 pass through a potential barrier by tunneling phenomena and are implanted into a conduction band of the insulator (tunneling insulator) 12 and the top electrode 13 to be hot electrons. Of the hot electrons, ones which reach the surface of the electrode with an energy above a work function $\phi$ of the top electrode 13 are emitted into a vacuum 20. In FIG. 1, the numeral 14 denotes a protection insulator; the numeral 15, a top electrode bus line lower layer; the numeral 16, a top electrode bus line; and the numeral 17, an interlayer insulator.

When displaying an image in the FED, a driving method called a line sequential scanning scheme is used standardly. When displaying 60-frame still images per second, display in each of the frames is performed for each scan line (horizontally). All the cold cathode electron sources corresponding to the number of data lines on the same scan line are operated at the same time.

To the scan line at operation, is flowed an electric current obtained by multiplying an electric current consumed by the cold cathode electron source included in a sub pixel by the number of all the data lines and a color number 3 (RGB). The scan line electric current brings a voltage drop along the scan line by wire resistance to inhibit a uniform operation of the cold cathode electron source.

The voltage drop is different depending on the cold cathode electron source systems. In the Spindt type electron source as the field emission electron source, almost 100% of the electron source current is emitted into a vacuum to reach an anode (phosphor surface). An electric current flowed to a gate line (scan line) is very small so that the influence of the voltage drop is less.

In the surface conduction type electron source as the same field emission type and the MIM type and MIS type electron sources as the hot electron type, at most several % of an electron source current reaches the anode. Most of it is flowed as a reactive current into the gate line (scan line). With the same anode current, these electron sources are affected by the voltage drop more easily than the spindt type.

The present inventors have been involved in the study and development of the MIM type electron source. We have designed and prototyped several kinds of FEDs to examine image display. In the FEDs, the scan line has always been selected for the bottom electrode 11.

In the hot electron type electron source, the film thickness of the top electrode 13 must be very small as about several nm to reduce scattering of hot electrons. Since the sheet resistance is inevitably high as above 100 $\Omega$/square, it is not suitable for the scan line.

The bottom electrode 11 is formed by an aluminum film having a film thickness of 300 nm. The scan line pitch is large as about three times the data line pitch. The line pitch is sufficient to easily suppress the sheet resistance to several 100 m$\Omega$/square. It is very natural that the bottom electrode 11 is selected for the scan line.

It has been gradually apparent that this structure is difficult to suppress a significant voltage drop with increase in screen size.

In the FED, a scan line current Is required to obtain a predetermined brightness is expressed by the following equation (1):

$$Is = Je \times S/\alpha \qquad (1)$$

where Je: an anode current density to obtain a predetermined brightness, S: an area of a display screen, and $\alpha$: a proportion of an anode current of an emitter current (also called an electron emission efficiency).

A voltage drop amount Vdrop produced at both ends of the scan line is expressed by the following equation (2):

$$Vdrop = \tfrac{1}{2} \times Id \times Rs \times (L/W) \qquad (2)$$

where Id: a driving current, Rs: a sheet resistance of a scan line, L: a long side length of a display screen, and W: a line pitch of the scan line.

When assuming that the screen size is increased while maintaining a resolution constant, the voltage drop amount Vdrop is found to be increased in proportion to $Rs \times S/\alpha$.

To suppress this, (1) The electron emission coefficient is increased.→The thickness of the top electrode 13 may be reduced. The lower limit is limited so that proportional reduction cannot be made.

(2) The sheet resistance Rs is lowered.→The thickness of the electrode is increased to reduce the resistivity. Improvement cannot be expected due to the following reasons (a) to (c).

(a) The tunneling insulator 12 must be of anodic oxidized alumina. Change of it to other materials cannot be made.

(b) Change of the deposition conditions (for example, making the substrate temperature higher) can lower the resistance of aluminum. The roughness of the film surface is deteriorated to impair the reliability of the tunneling insulator.

(c) When the film thickness is increased, the aluminum wire easily produces hillocks or voids in a heat treatment process. To prevent breakdown of the tunneling insulator, it is essential that the surface roughness of the electrode be maintained.

From the above views, in order that the MIM type electron source responds to a large screen display of a 40 inch class, it is essential to give a sheet resistance-scalable scan line.

To solve the above problems, an object of the present invention is to provide a display using hot electron type electron sources which can suppress a voltage drop amount produced in a scan line below an allowable range to obtain a high quality image without poor brightness uniformity when a screen size is increased.

To achieve the above object, the present inventors have variously experimented and studied such display using hot electron type electron sources to obtain the following findings. Using the top electrode bus line as the scan line and the bottom electrode as the data line, the MIM type electron source may display an image by the line sequential scanning scheme. In order to suppress the voltage drop amount Vdrop to an allowable range (for example, below 0.5V), the top electrode bus line may change the film thickness, the resistivity (material quality) and the deposition method to reduce the sheet resistance.

The present invention has been made based on such findings. The features of the present invention will be described in the following embodiments of the present invention.

SUMMARY OF THE INVENTION

In a first invention to achieve the above object, a display including:

a first substrate (electron source substrate) having, as a hot electron type electron source having a structure in which a bottom electrode, an electron accelerator of an insulator thin film and a top electrode are sequentially stacked onto a substrate, a plurality of first electrodes applying a driving voltage to the bottom electrode of the electron source device in a row or column direction of a plurality of electron source devices emitting an electron from the surface of the top electrode when applying a positive voltage to the top electrode arrayed in a matrix form and a plurality of second electrodes applying a driving voltage to the top electrode of the electron source device in the row or column direction of the plurality of electron source devices and having a sheet resistance lower than that of the first electrodes;

frame members and spacer members;

a second substrate (display side substrate) having phosphor layers; and.

a display device in which a space surrounded by the first substrate, the frame members and the second substrate is maintained in a vacuum atmosphere, wherein the first electrodes are a data line and the second electrodes are a scan line to display image information by a line sequential scanning scheme.

In a second invention to achieve the above object, the second electrode forming the hot electron type electron source consists of a multi layer wire structural body formed by stacked layers of a top electrode bus line upper layer including a metal film having a sheet resistance lower than that of the first electrode and a top electrode bus line lower layer electrically contacted with the top electrode.

In a third invention to achieve the above object, the second electrode forming the hot electron type electron source is made of a metal film having a sheet resistance lower than that of the first electrode and its edge is of a taper structure to be electrically contacted with the top electrode.

In a fourth invention to achieve the above object, the bottom electrode is of Al or an Al alloy such as Al—Nd, the electron accelerator of an insulator thin film is of an insulator thin film which anodic oxidizes the surface layer part of the bottom electrode, the top electrode is of a noble metal such as Ir, Pt or Au, the top electrode bus line lower layer is of a high melting point metal of Ti, Zr, Hf, V, Nb, Ta, Cr, Mo, W or an alloy thereof, and the top electrode bus line upper layer is of Al or an Al alloy having a film thickness larger than that of the top electrode bus line lower layer or Au, Ag, Ni, Cu or an alloy thereof having a resistivity lower than that of Al or an Al alloy.

Figure 1:
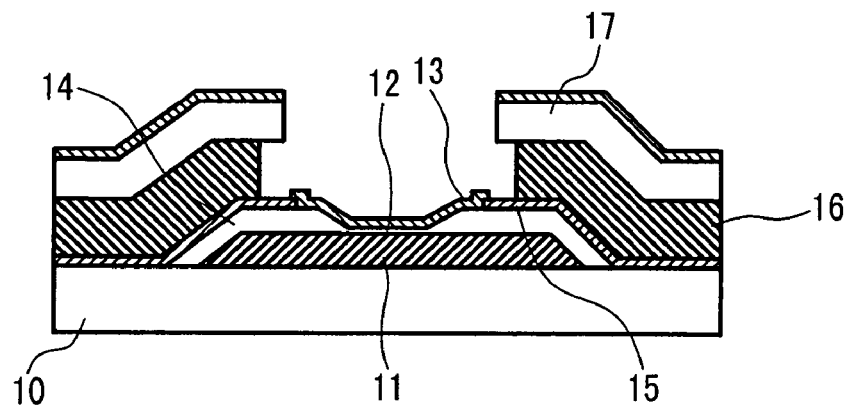
FIG. 1 is a diagram showing the structure of an MIM type electron source.
Figure 2:
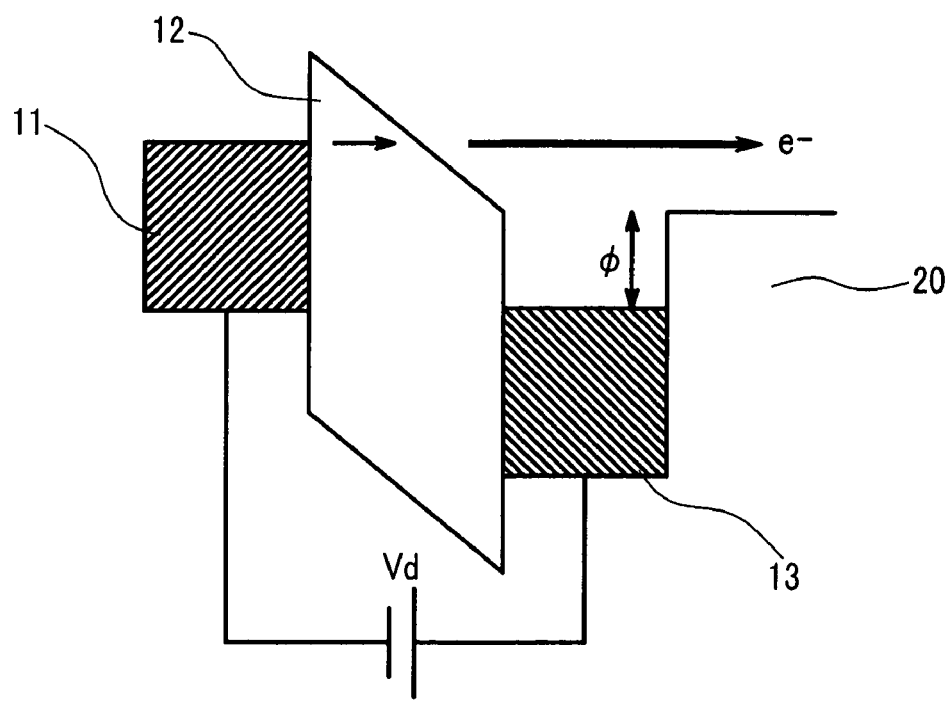
FIG. 2 is a diagram showing the operating principle of the MIM type electron source.

Reference numerals of the drawings are as follows:
10 Substrate
11 Bottom electrode
12 Tunneling insulator
13 Top electrode
14 Protection insulator
15 Top electrode bus line lower layer
16, 16' Top electrode bus line upper layer
16" Top electrode bus line
17 Interlayer insulator
17a Interlayer insulator lower layer
17b Interlayer insulator upper layer
18 Emission region
18a Open area
19 Photoresist
20 Vacuum
30 Spacer
40 Data line driving circuit
50 Scan line driving circuit
60 High voltage generating circuit
110 Surface plate
111 Red phosphor
112 Green phosphor
113 Blue phosphor
114 Metal back
115 Flit glass
116 Frame glass

DESCRIPTION OF THE PREFERRED EMBODIMENTS

Embodiments of the present invention will be described specifically according to the drawings.

<Embodiment 1>

A first Embodiment of the present invention will be described using FIGS. 3 to 12 showing a method for manufacturing an MIM type electron source. As shown in FIG. 12 later describing the structure of the MIM type electron source finally obtained by the manufacturing method, there is disclosed a manufacturing method when a top electrode 13 is electrically contacted with a top electrode bus line lower layer 15 and the top electrode bus line lower layer 15 is backed by a top electrode bus line upper layer 16 of aluminum or an aluminum alloy thicker than a bottom electrode 11.

Figure 3A:
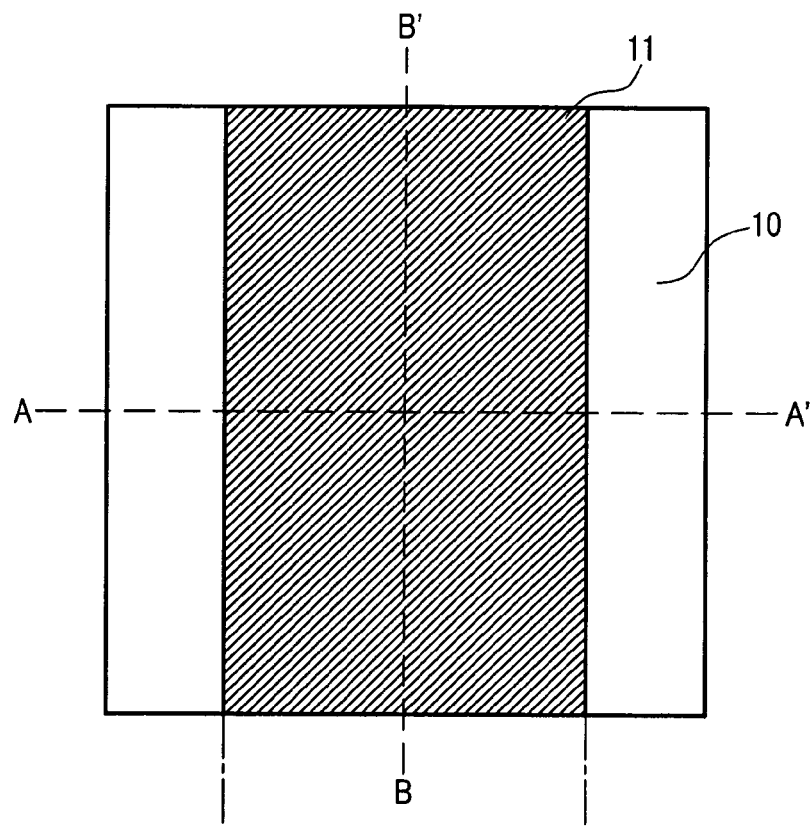
FIGS. 3A, 3B and 3C are diagrams showing a manufacturing method of the MIM type electron source according to the present invention.
Figure 3B:
Figure 3C:

As shown in FIG. 3, a metal film for the bottom electrode 11 is deposited on an insulating substrate 10 such as glass. FIG. 3A shows a plan view. FIG. 3B shows a cross-sectional view taken along line A–A'. FIG. 3C shows a cross-sectional view taken along line B–B'. Al or an Al alloy is used as the bottom electrode material. An Al—Nd alloy in which Nd is doped by 2 atomic weight % is used. For the deposition, a sputtering method is used. The film thickness is 300 nm.

After the deposition, the stripe type bottom electrode 11 is formed by a photolithography process and an etching process. Wet etching is applied by a mixed solution of phosphoric acid, acetic acid and nitric acid.

Figure 4A:
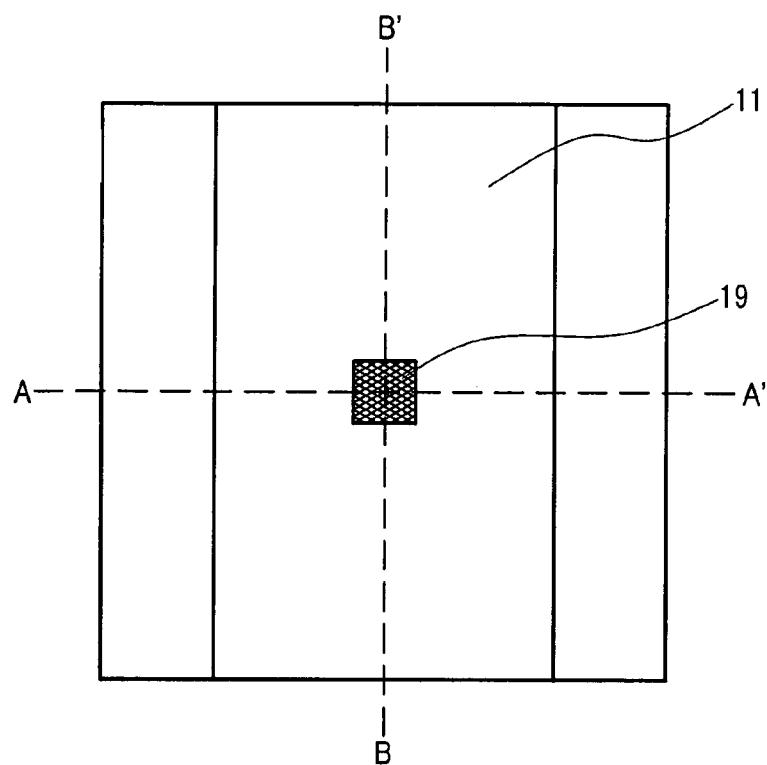
FIGS. 4A, 4B and 4C are diagrams showing a manufacturing method of the MIM type electron source according to the present invention.
Figure 4B:
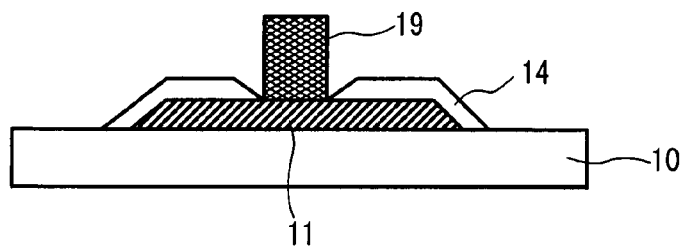
Figure 4C:
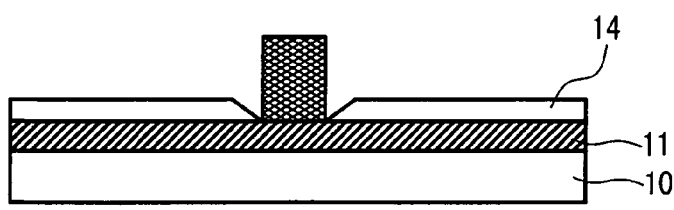
Figure 5A:
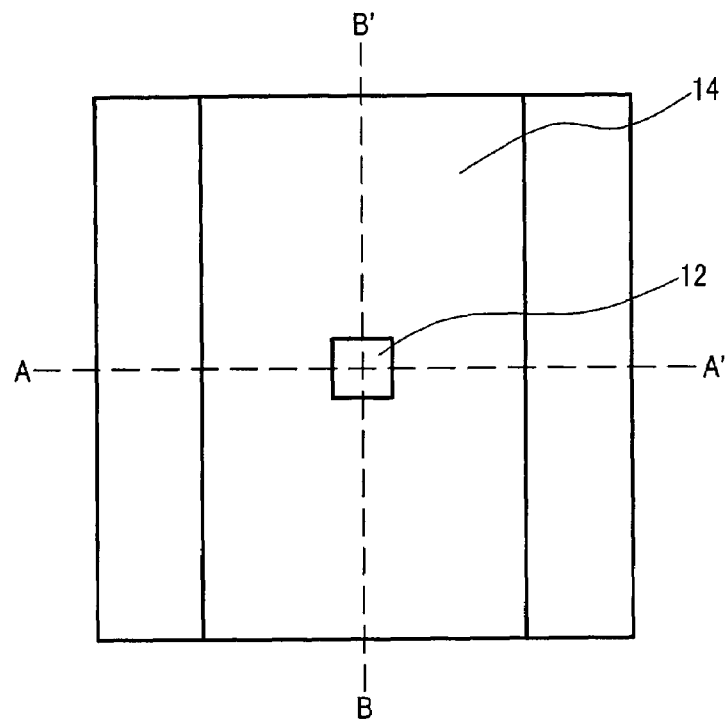
FIGS. 5A, 5B and 5C are diagrams showing a manufacturing method of the MIM type electron source according to the present invention.
Figure 5B:
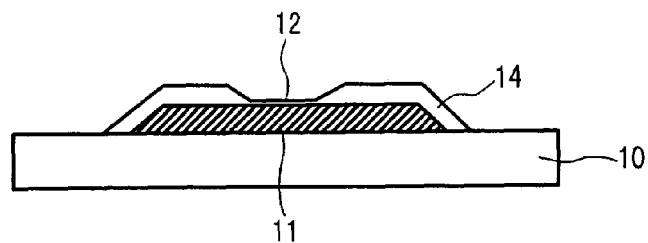
Figure 5C:
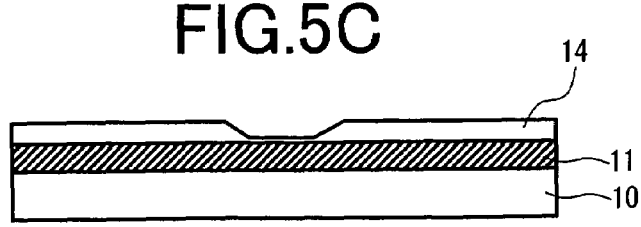

A method for forming a protection insulator 14 and an insulator 12 will be described using FIGS. 4 and 5. FIGS. 4A and 5A show plan views. FIGS. 4B and 5B show cross-sectional views taken along line A–A'. FIGS. 4C and 5C show cross-sectional views taken along line B–B'.

As shown in FIG. 4, an emission region on the bottom electrode 11 is covered by a photoresist 19. Other exposed parts are selectively anodic oxidized to be thick, providing the protection insulator 14 of an oxidized film. When the formation voltage is 100V, the protection insulator 14 having a thickness of about 136 nm is formed.

As shown in FIG. 5, the photoresist 19 is removed to anodic oxidize the surface of the remaining bottom electrode 11 as the emission region to be thin. When the formation voltage is 6V, the insulator 12 having a thickness of about 10 nm is formed on the bottom electrode 11. The thin insulator 12 becomes an electron accelerator (tunneling insulator).

Figure 6A:
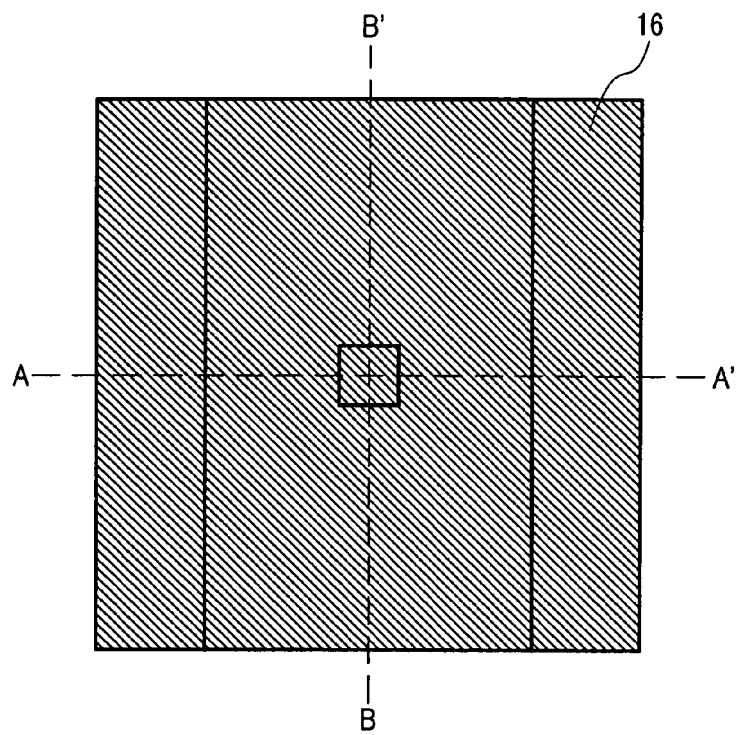
FIGS. 6A, 6B and 6C are diagrams showing a manufacturing method of the MIM type electron source according to the present invention.
Figure 6B:
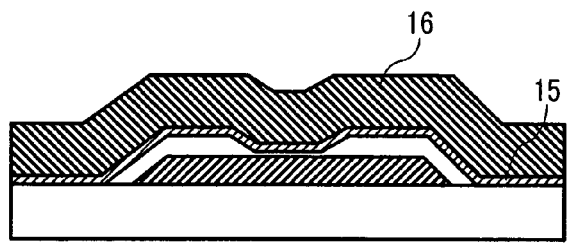
Figure 6C:
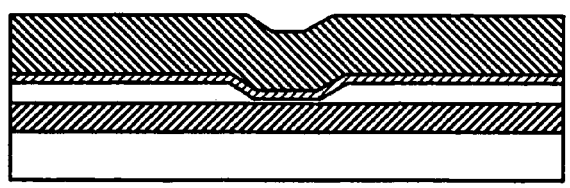

As shown in FIG. 6, electrode films as a bus line to the top electrode 13 (stacked layers of the top electrode bus line lower layer 15 and the top electrode bus line upper layer 16) are deposited by the sputtering method. FIG. 6A shows a plan view. FIG. 6B shows a cross-sectional view taken along line A–A'. FIG. 6C shows a cross-sectional view taken along line B–B'.

Tungsten (W) is used as the material of the top electrode bus line lower layer 15 as the stacked layer. The same Al—Nd alloy as the bottom electrode 11 is used as the material of the top electrode bus line upper layer 16.

The film thickness of the top electrode bus line lower layer 15 is small as about several 10 nm so as not to disconnect the later-formed top electrode 13 by the step of the top electrode bus line lower layer 15. The film thickness of the top electrode bus line upper layer 16 is large as 5 um to sufficiently lower the sheet resistance (For appearance, the thickness is small in the drawing.). The deposition conditions are changed to set the substrate temperature to be higher than room temperature. The grain growth of aluminum is promoted to lower the resistivity. In this case, the roughness of the surface is deteriorated, which cannot affect the function of the MIM type electron source.

Figure 7A:
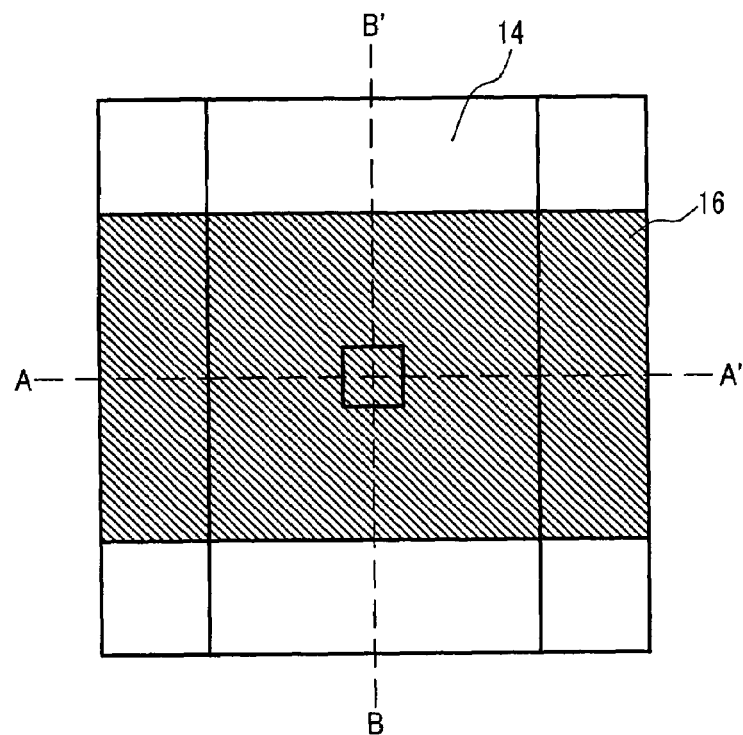
FIGS. 7A, 7B and 7C are diagrams showing a manufacturing method of the MIM type electron source according to the present invention.
Figure 7B:
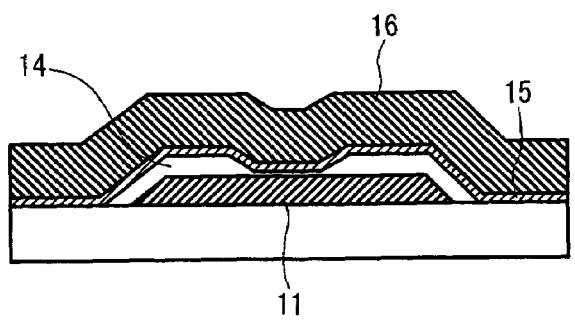
Figure 7C:
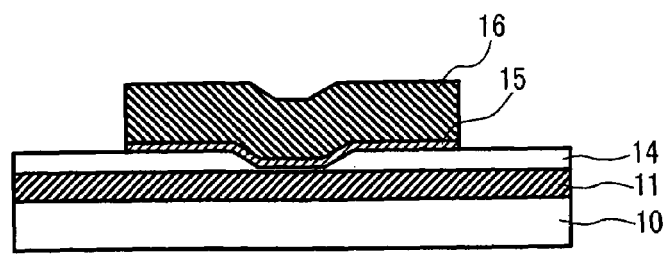

As shown in FIG. 7, the top electrode bus line upper layer 16 is processed in a strip type in the direction orthogonal to the bottom electrode 11 by the photolithography process and the etching process. FIG. 7A shows a plan view. FIG. 7B shows a cross-sectional view taken along line A–A'. FIG. 7C shows a cross-sectional view taken along line B–B'.

A mixed solution (PAN) of phosphoric acid, acetic acid and nitric acid is used for the etching. The top electrode bus line lower layer 15 is processed by wet etching using the same photoresist pattern. For the wet etching of W, a mixed solution of an ammonia solution and hydrogen peroxide is suitable.

Figure 8A:
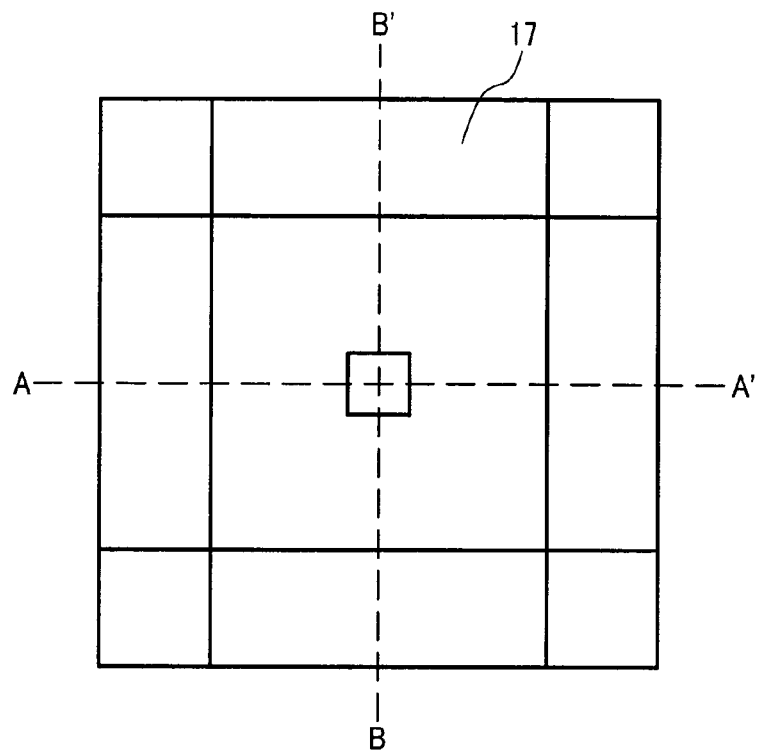
FIGS. 8A, 8B and 8C are diagrams showing a manufacturing method of the MIM type electron source according to the present invention.
Figure 8B:
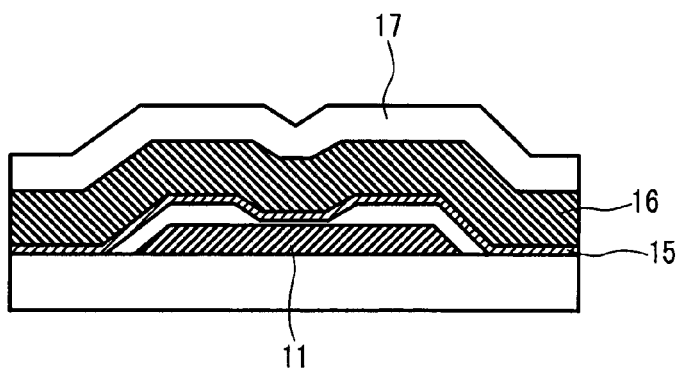
Figure 8C:
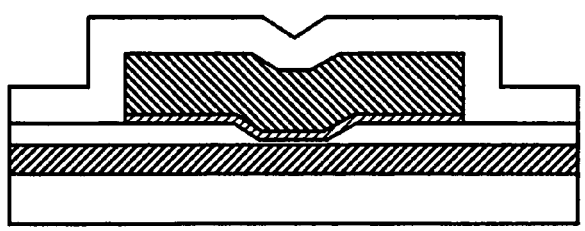

After completion of separation of the top electrode bus lines (stacked layers of the lower layer 15 and the upper layer 16), as shown in FIG. 8, an interlayer insulator 17 is deposited on the entire surface by sputtering. SiOx is used and the film thickness is 300 nm. FIG. 8A shows a plan view. FIG. 8B shows a cross-sectional view taken along line A–A'. FIG. 8C shows a cross-sectional view taken along line B–B'. The interlayer insulator 17 later separates the top electrode later for each pixel and protects the electron source from an atmospheric pressure applied to a spacer when being pumped into a vacuum vessel.

Figure 9A:
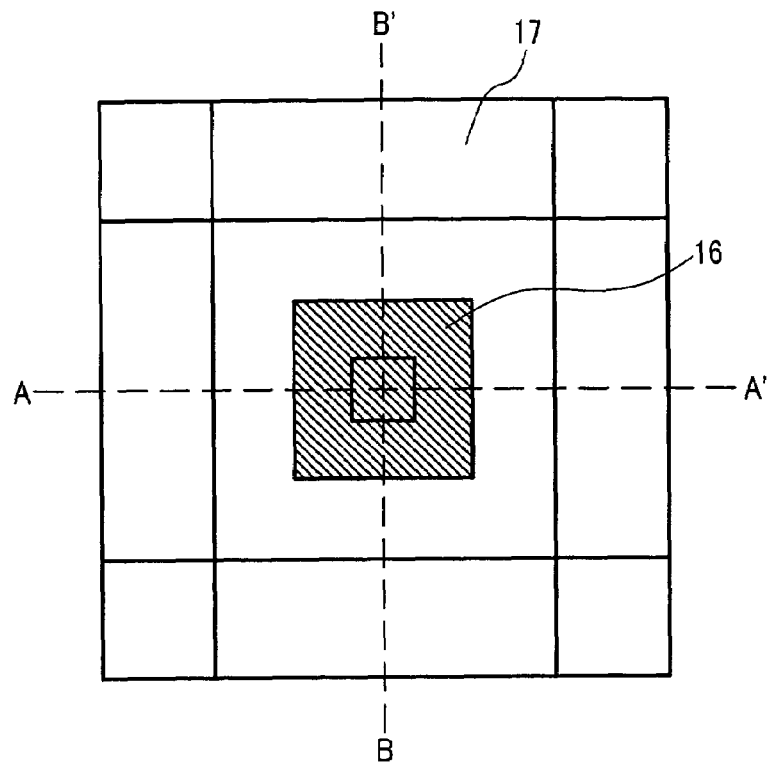
FIGS. 9A, 9B and 9C are diagrams showing a manufacturing method of the MIM type electron source according to the present invention.
Figure 9B:
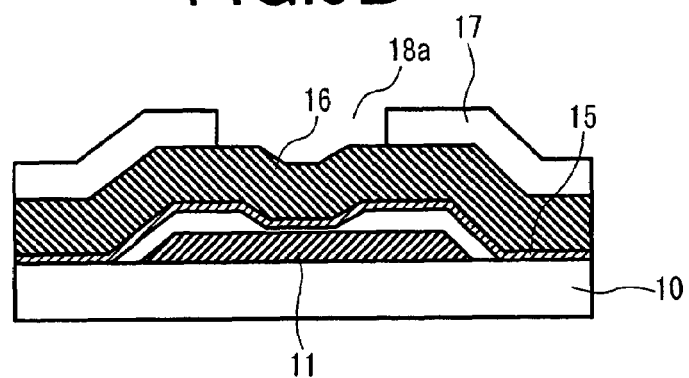
Figure 9C:
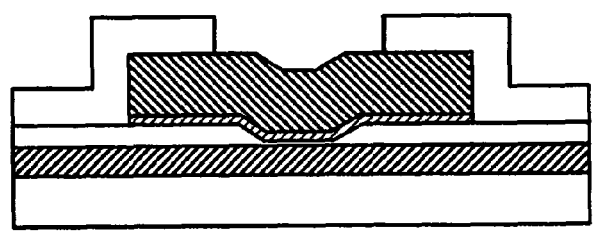

In FIG. 9, to open a later-described emission region 18, part of the interlayer insulator 17 is opened by the photolithography process and a dry etching process (an open area 18a). For the dry etching, a mixed gas of $CF_4$ and $O_2$ is suitable. FIG. 9A shows a plan view. FIG. 9B shows a cross-sectional view taken along line A–A'. FIG. 9C shows a cross-sectional view taken along line B–B'.

Figure 10A:
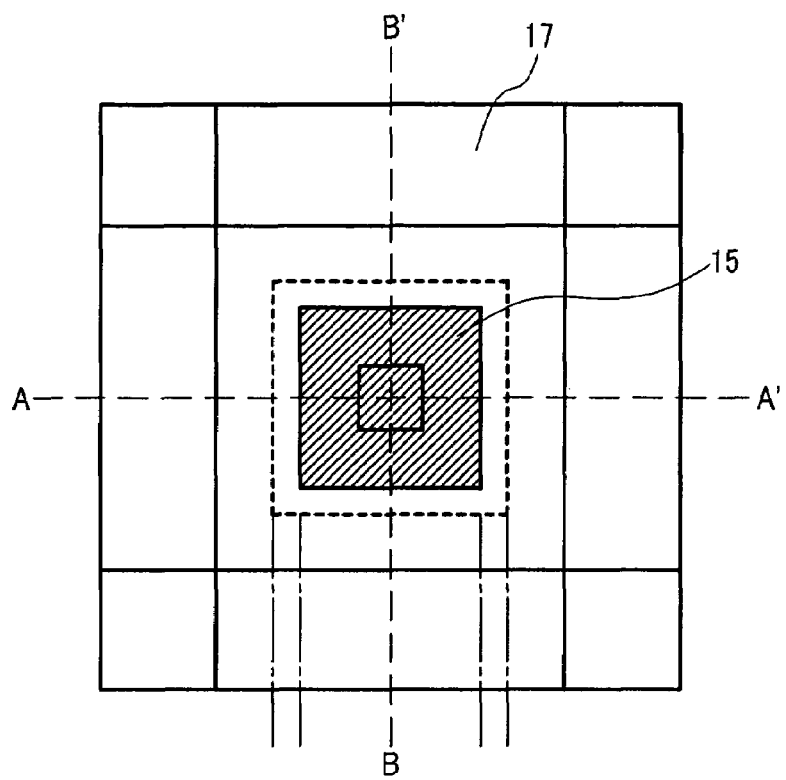
FIGS. 10A, 10B and 10C are diagrams showing a manufacturing method of the MIM type electron source according to the present invention.
Figure 10B:
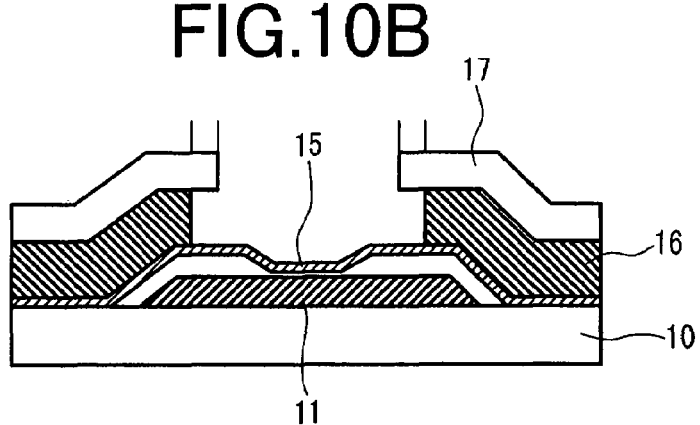
Figure 10C:
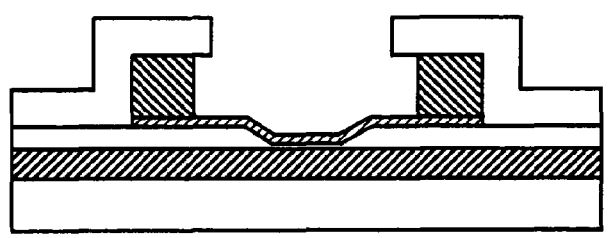

In FIG. 10, with the interlayer insulator 17 as a mask, the top electrode bus line upper layer 16 is removed using the above PAN liquid. By side etching along with wet etching, an "eave"-shaped projection is formed in the interlayer insulator 17. FIG. 10A shows a plan view. FIG. 10B shows a cross-sectional view taken along line A–A'. FIG. 10C shows a cross-sectional view taken along line B–B'.

Figure 11A:
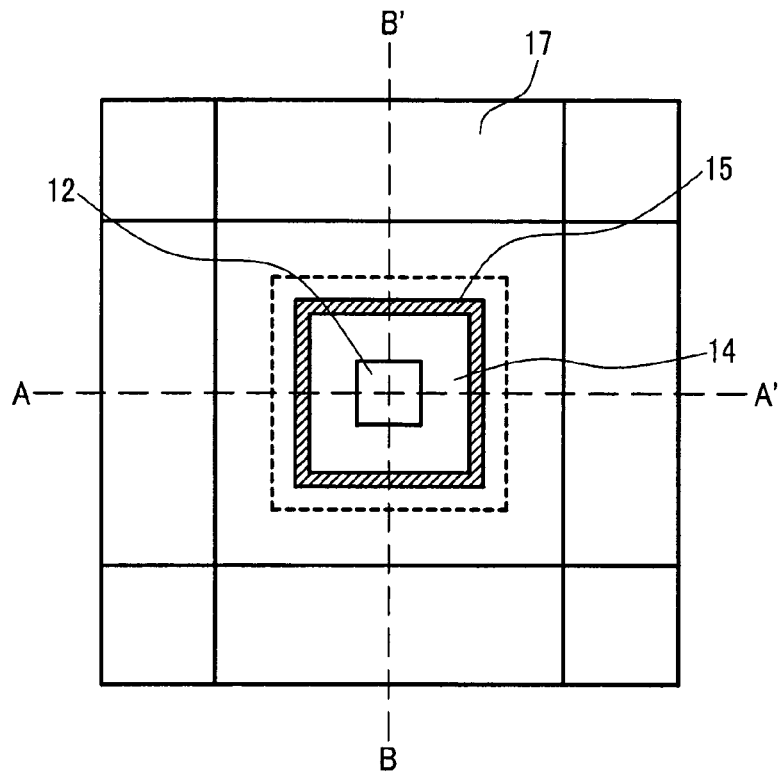
FIGS. 11A, 11B and 11C are diagrams showing a manufacturing method of the MIM type electron source according to the present invention.
Figure 11B:
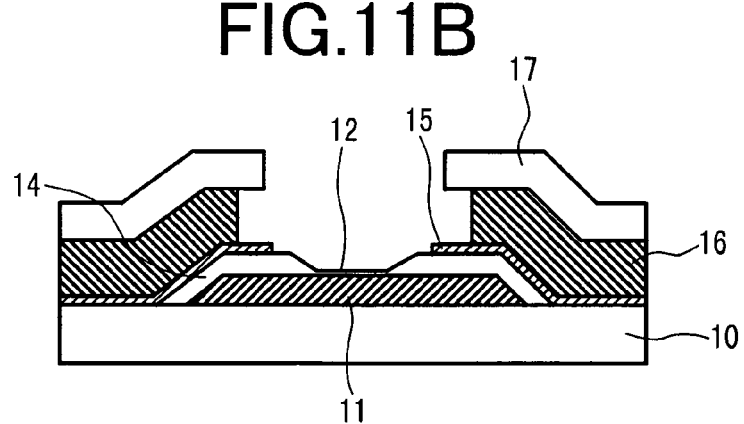
Figure 11C:
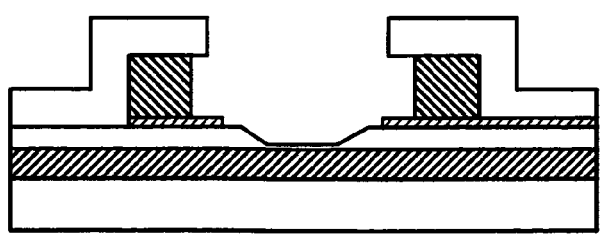

In FIG. 11, part of the W film of the top electrode bus line lower layer 15 is removed by the photolithography process and the wet etching process to expose the tunneling insulator 12. For the etching of W, a mixed solution of an ammonia solution and hydrogen peroxide is suitable. It should be noted that to secure an electrical contact of the emission region to the later-made top electrode 13, the top electrode bus line lower layer 15 is processed to be projected from the top electrode bus line upper layer 16. The exposed tunneling insulator 12 is anodic oxidized again to recover damage due to the processing. FIG. 11A shows a plan view. FIG. 11B shows a cross-sectional view taken along line A–A'. FIG. 11C shows a cross-sectional view taken along line B–B'.

In FIG. 12, the top electrode 13 is formed so as to cover the exposed tunneling insulator 12 and the peripheral edge of the top electrode bus line lower layer 15, thereby completing the electron source substrate.

Figure 12A:
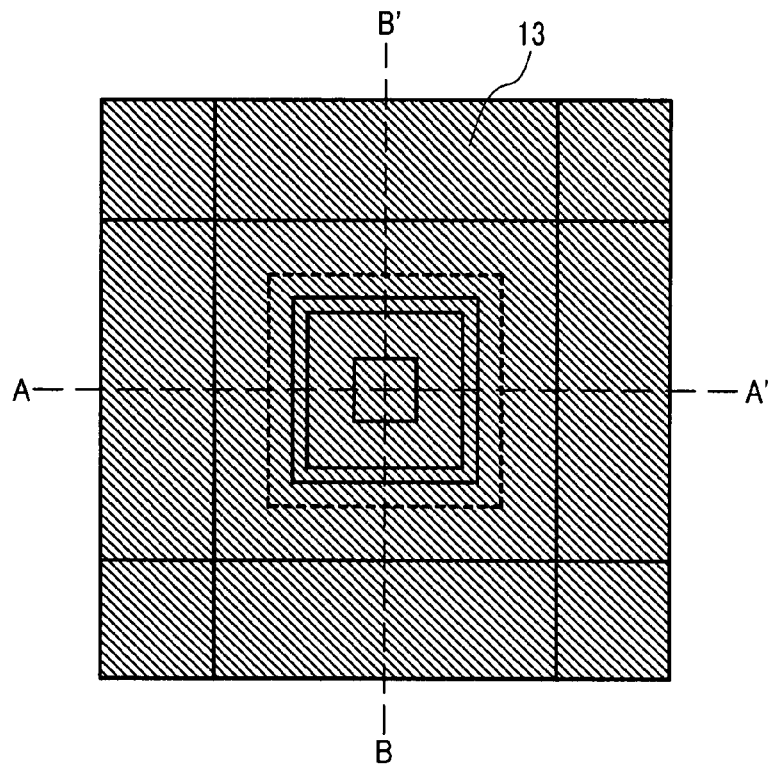
FIGS. 12A, 12B and 12C are diagrams showing a manufacturing method of the MIM type electron source according to the present invention.
Figure 12B:
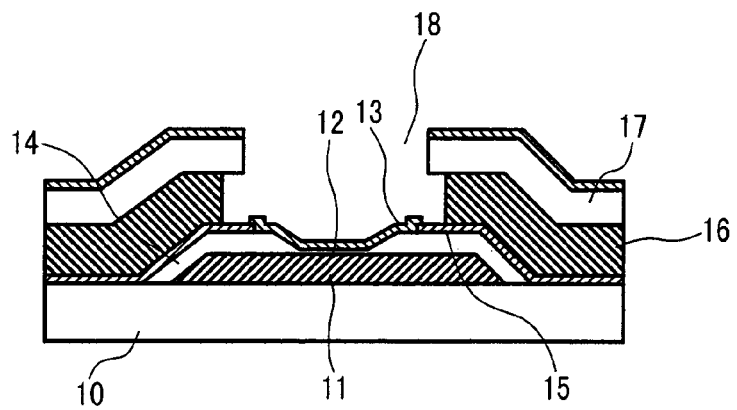
Figure 12C:
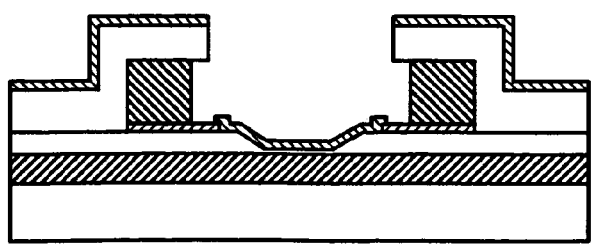

The top electrode 13 is deposited by sputtering. As the top electrode 13, stacked layers of Ir, Pt and Au are used. The film thickness is several nm. For the deposition, the top electrode 13 causes poor coverage in the "eave" part to be separated for each pixel. The damage of the top electrode 13 and the tunneling insulator 12 caused by the photolithography can be prevented. FIG. 12A shows a plan view. FIG. 12B shows a cross-sectional view taken along line A–A'. FIG. 12C shows a cross-sectional view taken along line B–B'.

As described above, in the electron source substrate of this example, the stacked top electrode bus line lower layer 15 and upper layer 16 are a scan line and the bottom electrode 11 is a data line. It is possible to obtain the MIM type electron source substrate having a low resistance value in which the sheet resistance of the scan line is 10 mΩ/square.

An example of a first substrate for use in the display of the present invention corresponds to an electron source substrate shown in FIG. 12. A first electrode of the first substrate corresponds to the bottom electrode 11 and a second electrode thereof corresponds to the stacked top electrode bus line lower layer 15 and upper layer 16.

<Embodiment 2>

Figure 19A:
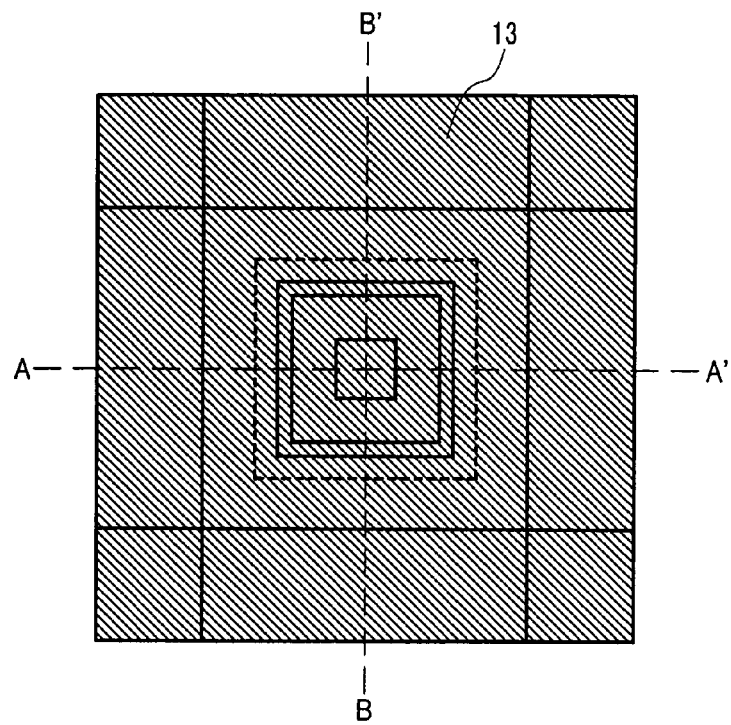
FIGS. 19A, 19B and 19C are diagrams showing a manufacturing method of the MIM type electron source according to the present invention.
Figure 19B:
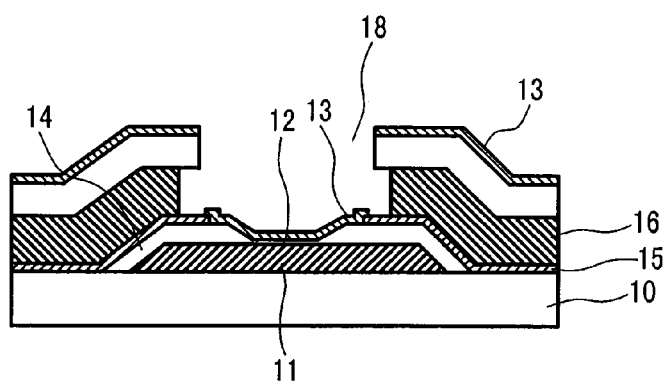
Figure 19C:
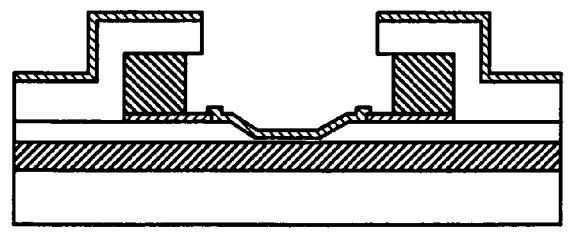

A second Embodiment of the present invention will be described using FIGS. 13 to 19 showing a method for manufacturing an MIM type electron source. As shown in FIG. 19 later describing the structure of the MIM type electron source finally obtained by the manufacturing method, there is disclosed a manufacturing method when a top electrode 13 is electrically contacted with a top electrode bus line lower layer 15 and the top electrode bus line lower layer 15 is backed by a top electrode bus line upper layer 16 of a metal having a resistivity lower than that of a bottom electrode 11.

Figure 13A:
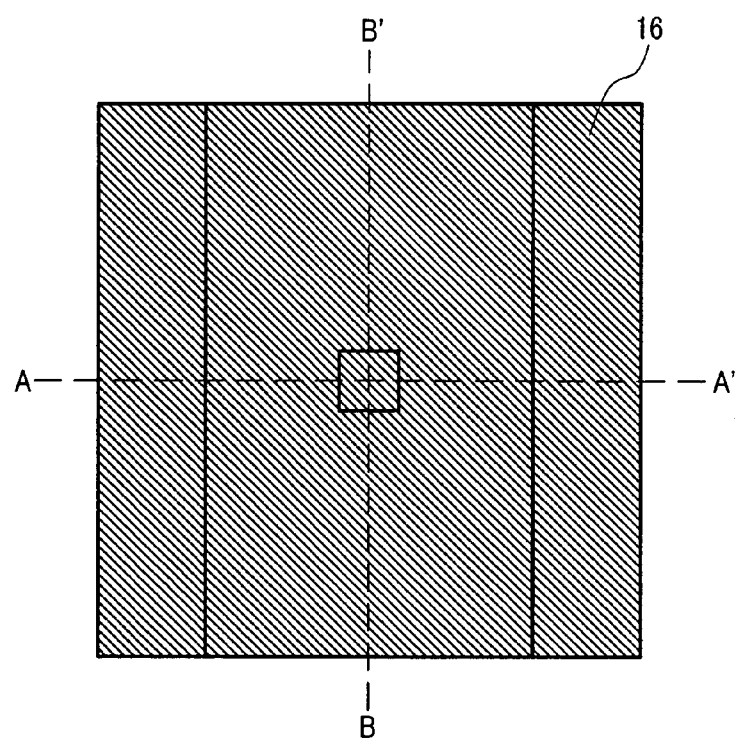
FIGS. 13A, 13B and 13C are diagrams showing a manufacturing method of the MIM type electron source according to the present invention.
Figure 13B:
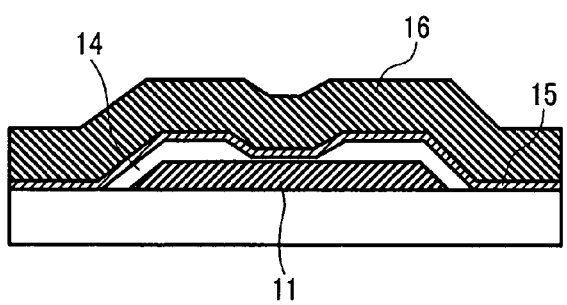
Figure 13C:
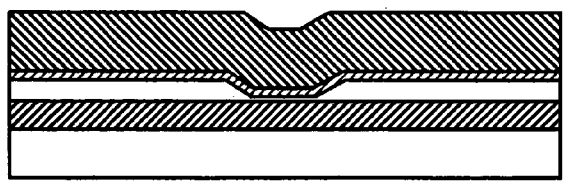
Figure 14A:
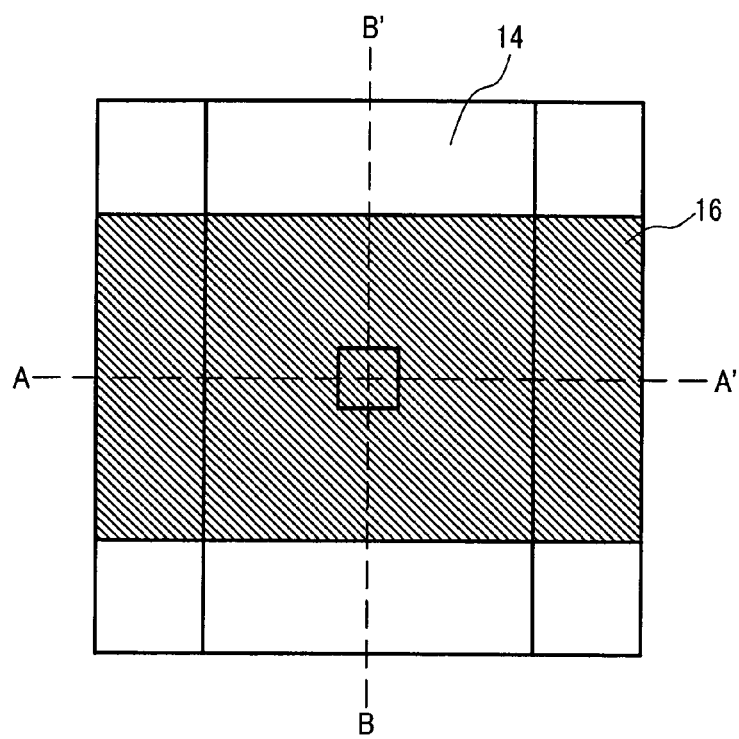
FIGS. 14A, 14B and 14C are diagrams showing a manufacturing method of the MIM type electron source according to the present invention.
Figure 14B:
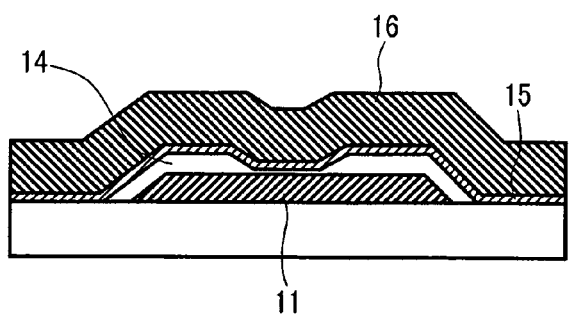
Figure 14C:
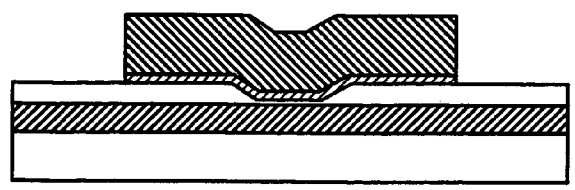
Figure 15A:
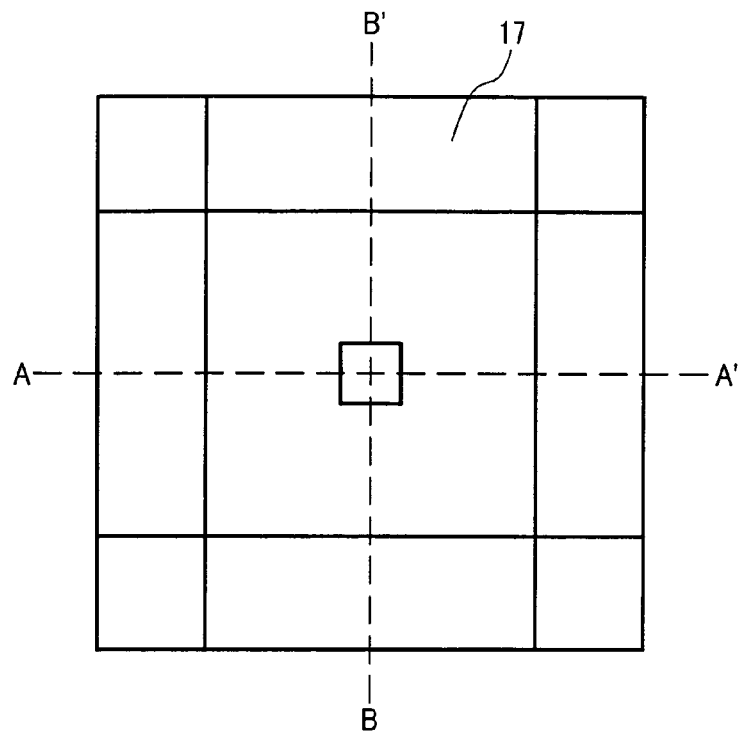
FIGS. 15A, 15B and 15C are diagrams showing a manufacturing method of the MIM type electron source according to the present invention.
Figure 15B:
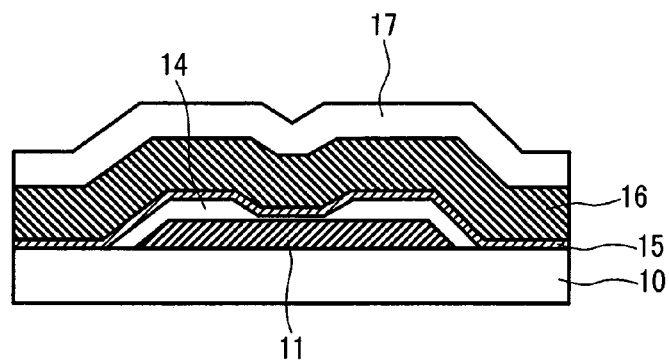
Figure 15C:
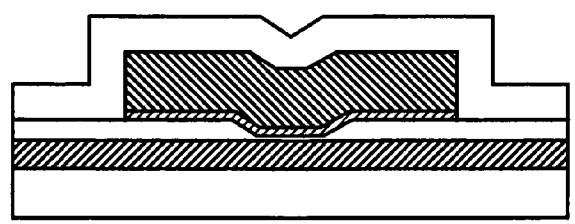
Figure 16A:
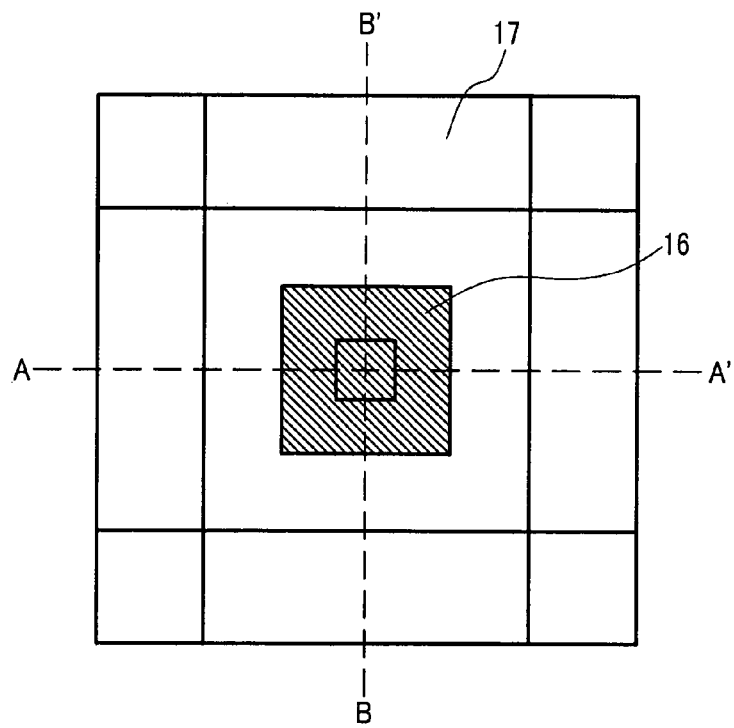
FIGS. 16A, 16B and 16C are diagrams showing a manufacturing method of the MIM type electron source according to the present invention.
Figure 16B:
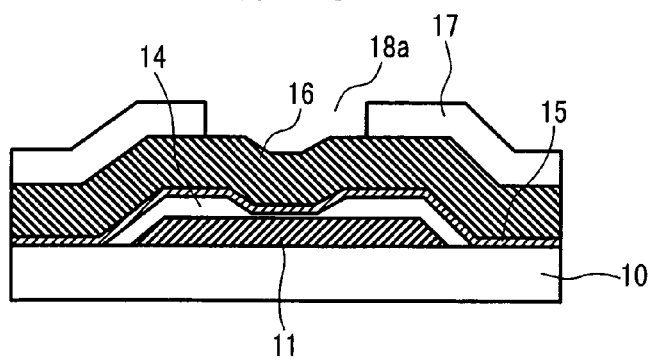
Figure 16C:
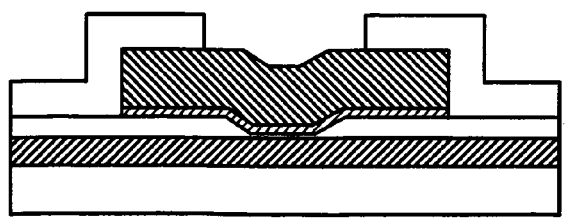
Figure 17A:
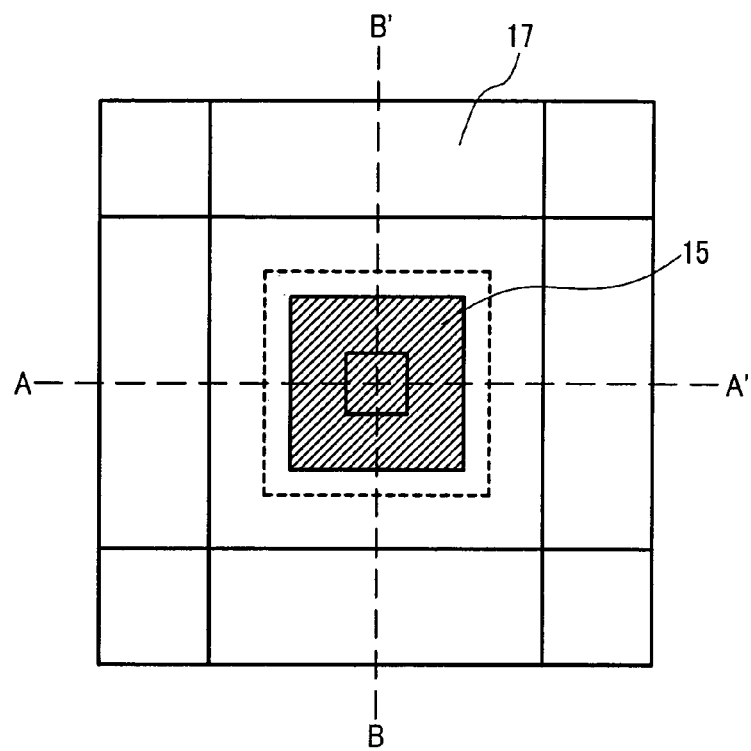
FIGS. 17A, 17B and 17C are diagrams showing a manufacturing method of the MIM type electron source according to the present invention.
Figure 17B:
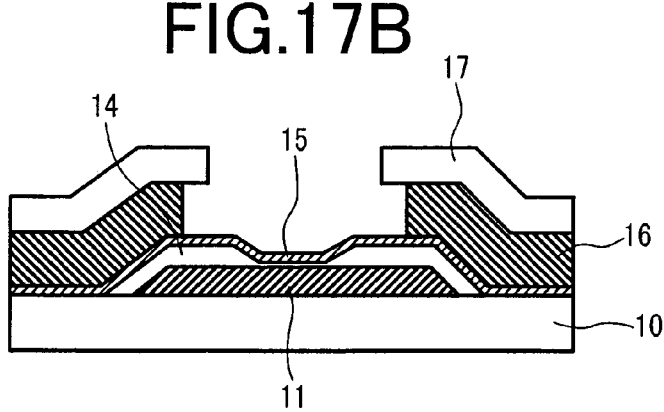
Figure 17C:
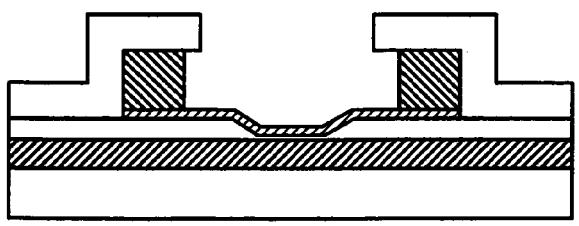
Figure 18A:
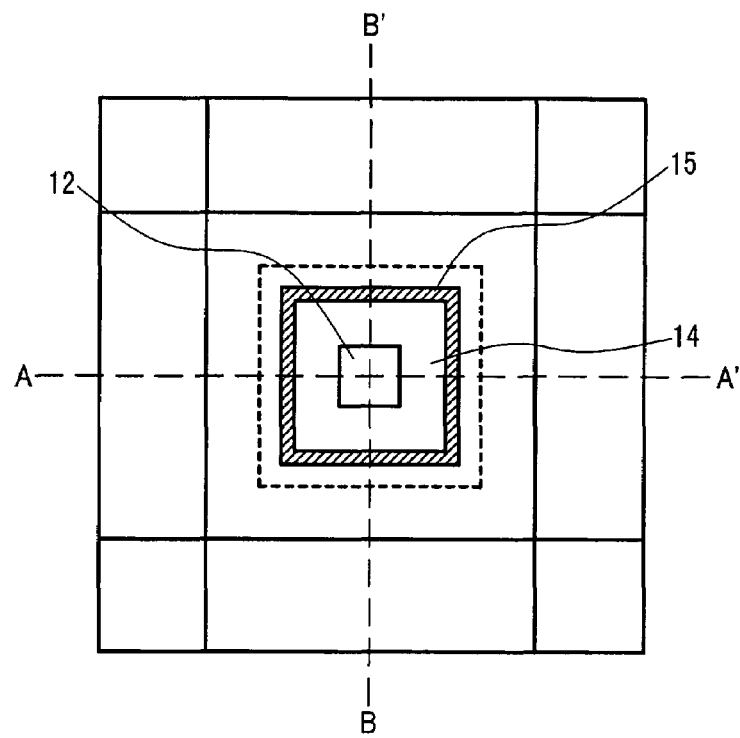
FIGS. 18A, 18B and 18C are diagrams showing a manufacturing method of the MIM type electron source according to the present invention.
Figure 18B:
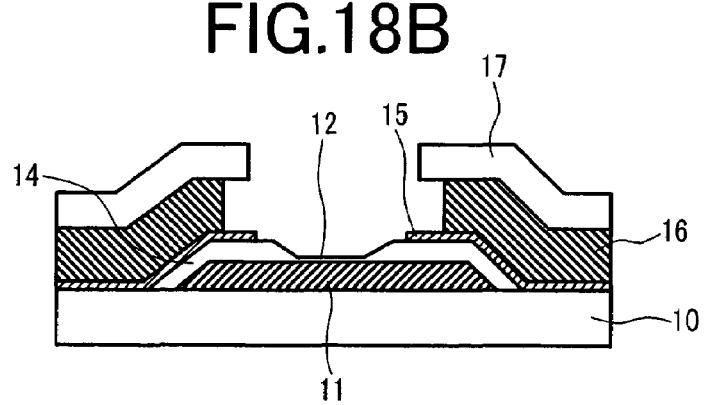
Figure 18C:
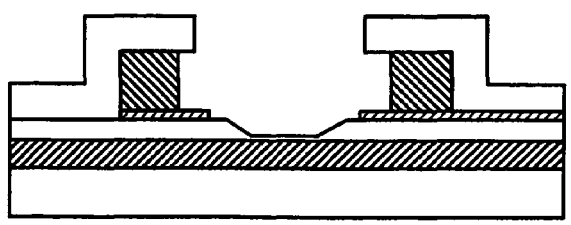

According to FIGS. 3 to 5 of Embodiment 1, a tunneling insulator 12 is formed. As shown in FIG. 13, the top electrode bus line lower layer 15 and the top electrode bus line upper layer 16 are deposited in that order by sputtering. FIG. 13A shows a plan view. FIG. 13B shows a cross-sectional view taken along line A–A'. FIG. 13C shows a cross-sectional view taken along line B–B'.

As the material of the top electrode bus line upper layer 16, Cu having a resistivity lower than that of aluminum is deposited to be 5 um. As the material of the top electrode bus line lower layer 15, a high melting point metal, particularly, chrome Cr is preferable to secure the adherability of an insulator 14 as a base and the Cu film as the top electrode bus line upper layer 16. The film thickness of Cr is set to be about several 10 nm from the same reason as that of W of Embodiment 1.

In FIGS. 14 to 19, the same method of FIGS. 7 to 12 of Embodiment 1 is followed. In this example, the top electrode bus line lower layer 15 is changed from W of Embodiment 1 to Cr and the top electrode bus line upper layer 16 is changed from Al of Embodiment 1 to Cu. In the etching process of FIG. 19, the corresponding wet etching solution must be changed to a cerium diammonium nitrate solution and a ferric chloride solution.

As described above, in the electron source substrate of this example, the stacked top electrode bus line lower layer 15 and upper layer 16 are a scan line and the bottom electrode 11 is a data line. It is possible to obtain the MIM type electron source substrate having a low resistance value in which the sheet resistance of the scan line is 5 mΩ/square.

An example of a first substrate for use in the display of the present invention corresponds to the electron source substrate shown in FIG. 19. A first electrode of the first substrate corresponds to the bottom electrode 11 and a second electrode thereof corresponds to the stacked top electrode power bus line lower layer 15 and upper layer 16.

<Embodiment 3>

Figure 25A:
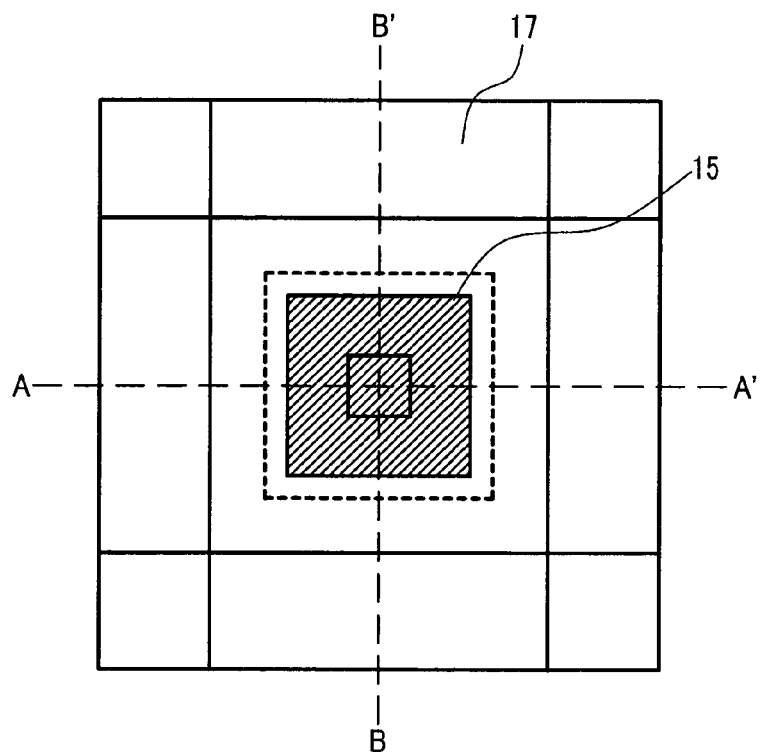
FIGS. 25A, 25B and 25C are diagrams showing a manufacturing method of the MIM type electron source according to the present invention.
Figure 25B:
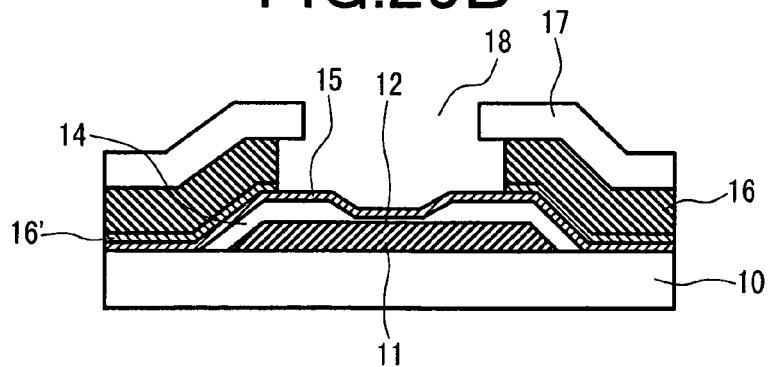
Figure 25C:
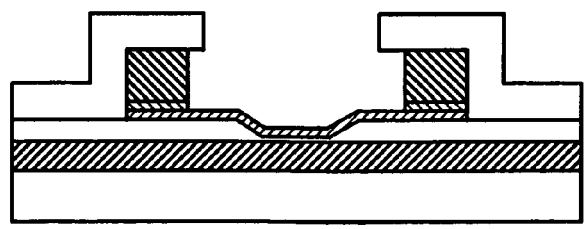
Figure 26A:
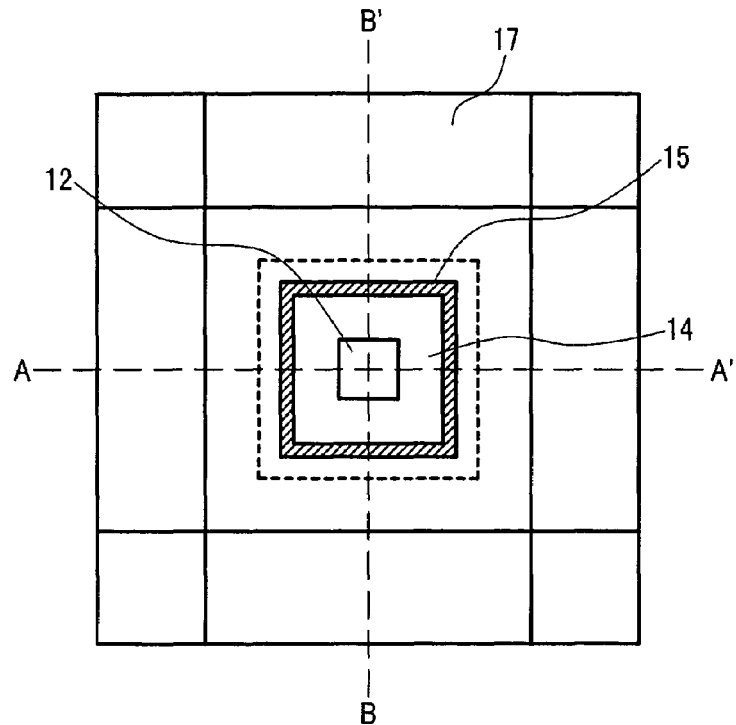
FIGS. 26A, 26B and 26C are diagrams showing a manufacturing method of the MIM type electron source according to the present invention.
Figure 26B:
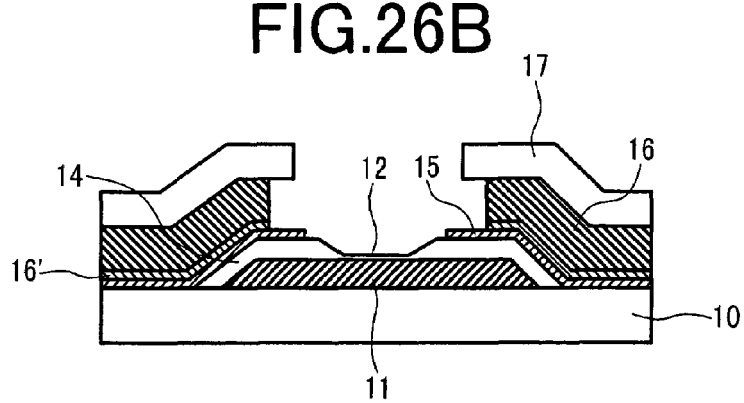
Figure 26C:
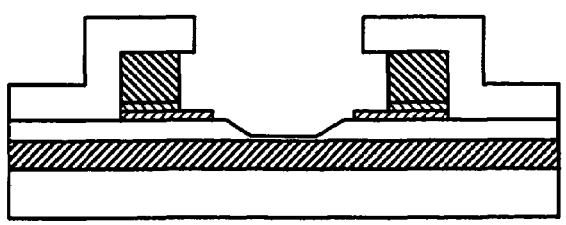
Figure 27A:
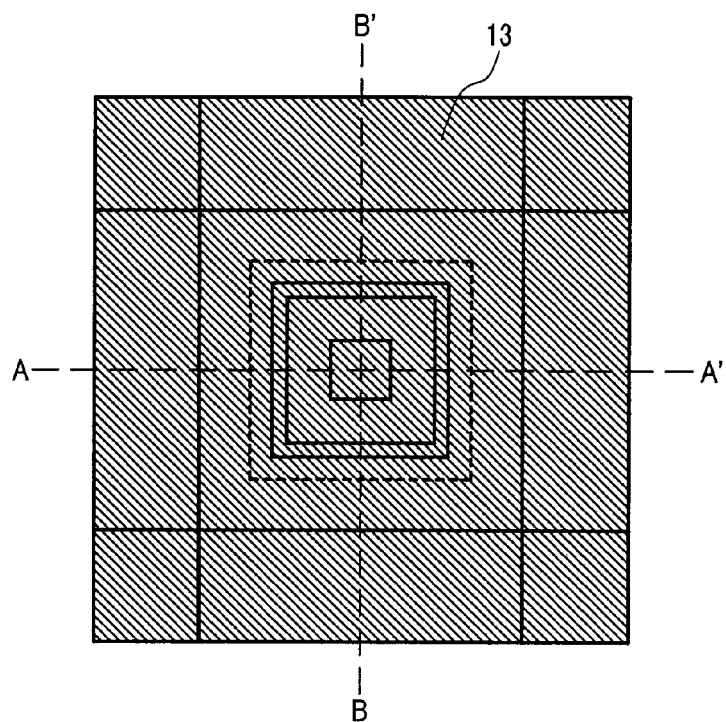
FIGS. 27A, 27B and 27C are diagrams showing a manufacturing method of the MIM type electron source according to the present invention.
Figure 27B:
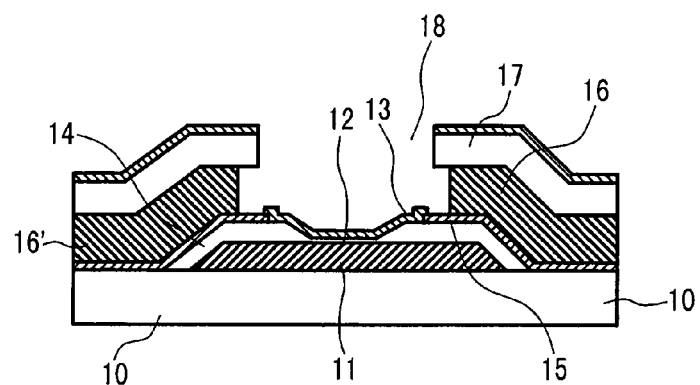
Figure 27C:
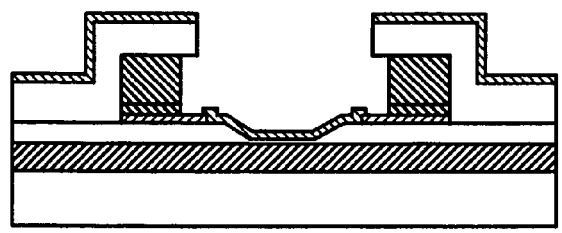

A third Embodiment of the present invention will be described using FIGS. 20 to 27 showing a method for manufacturing an MIM type electron source. As shown in FIG. 27 later describing the structure of the MIM type electron source finally obtained by the manufacturing method, there is disclosed a manufacturing method when the structure of Embodiment 2 is extended and a top electrode bus line upper layer 16 backing a top electrode bus line lower layer 15 is formed by plating to be thick.

In FIG. 20, Cu as a base seed film 16' when forming the top electrode bus line upper layer 16 by plating in the later process and Cr as the top electrode bus line lower layer 15 to secure the adherability of Cu and the base are successively deposited by sputtering. The film thickness of the top electrode bus line lower layer 15 is set to be about several 10 nm as that of W of Embodiment 1.

Figure 20A:
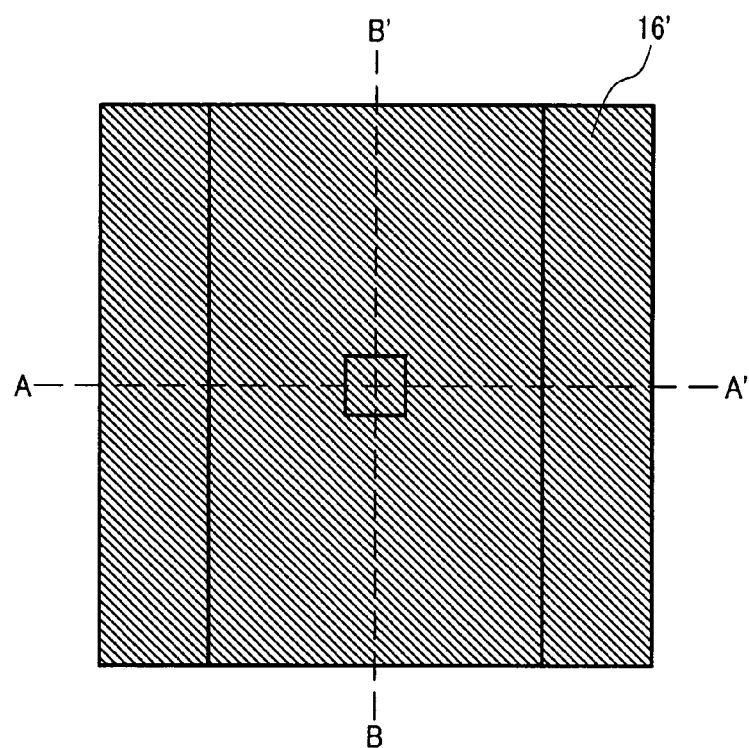
FIGS. 20A, 20B and 20C are diagrams showing a manufacturing method of the MIM type electron source according to the present invention.
Figure 20B:
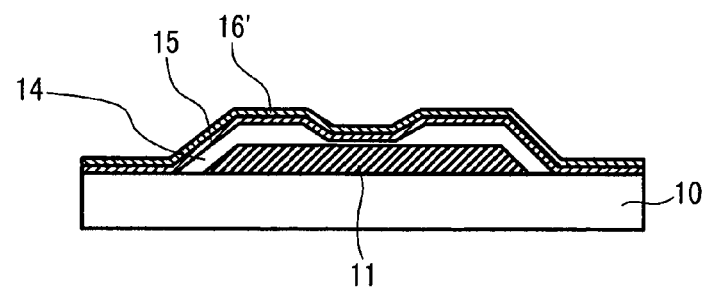
Figure 20C:
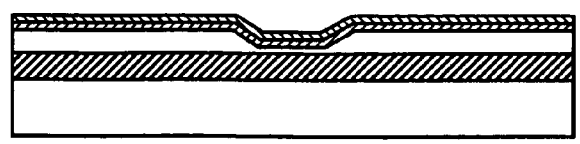

The film thickness of the base seed film 16' when forming the top electrode bus line upper layer by plating is not limited. It is decided in consideration of coatability so as not to elute the top electrode bus line lower layer 15 for the plating process. FIG. 20A shows a plan view. FIG. 20B shows a cross-sectional view taken along line A–A'. FIG. 20C shows a cross-sectional view taken along line B–B'.

FIG. 21 shows the process for forming a photoresist pattern 19. The photoresist pattern 19 orthogonal to a bottom electrode 11 is formed on the plated base seed layer 16' by a known lithography technique.

Figure 21A:
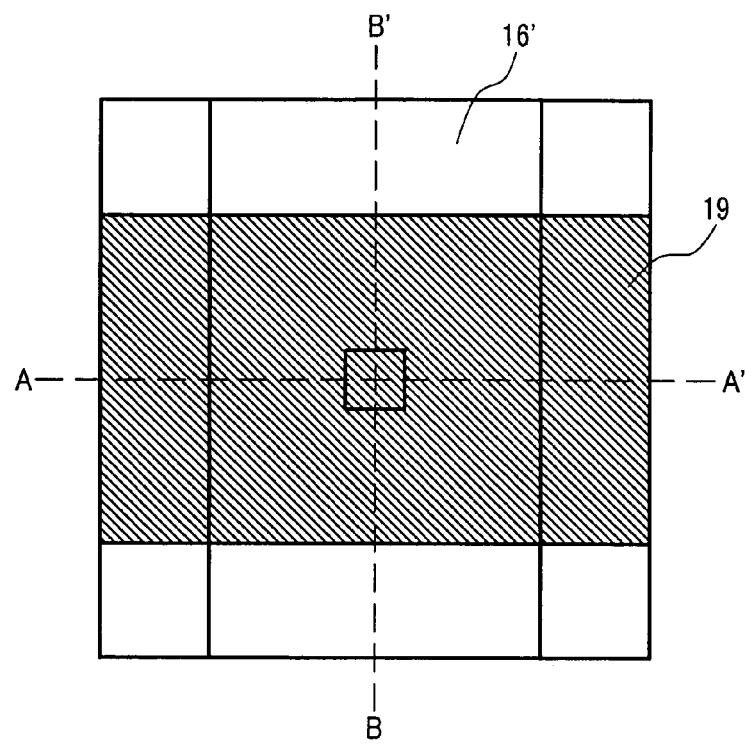
FIGS. 21A, 21B and 21C are diagrams showing a manufacturing method of the MIM type electron source according to the present invention.
Figure 21B:
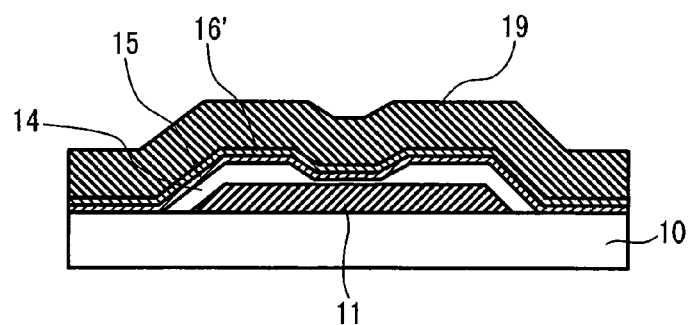
Figure 21C:
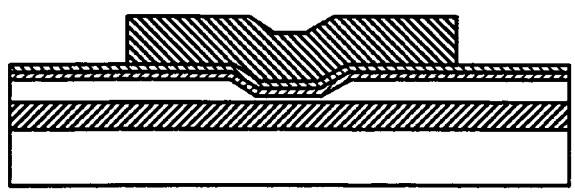
Figure 22A:
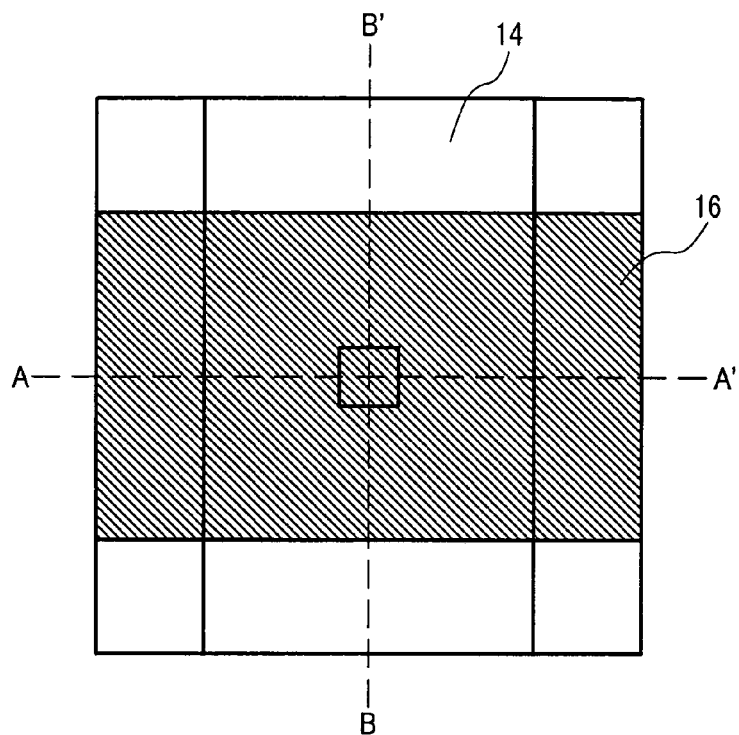
FIGS. 22A, 22B and 22C are diagrams showing a manufacturing method of the MIM type electron source according to the present invention.
Figure 22B:
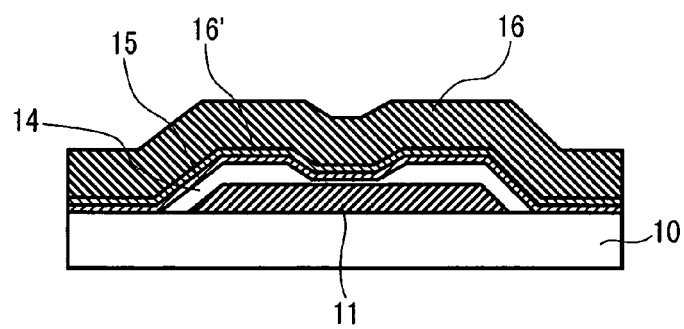
Figure 22C:
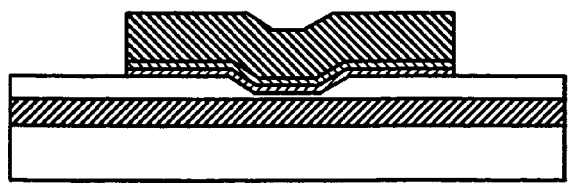

FIG. 22 shows the etching process of the plated base seed film 16' and the top electrode bus line lower layer 15 and the plating process onto the plated base seed film 16'. After providing the photoresist pattern orthogonal to the bottom electrode 11 on the plated base seed film 16', with the photoresist pattern 19 as a mask, a double layer of the plated base seed film 16' and the top electrode bus line lower layer 15 is selectively removed by etching to form a wire pattern. The photoresist pattern is removed to make Cu thick on the plated base seed film 16' by electro plating or electroless plating, forming the top electrode bus line upper layer 16 having a desired thickness of 5 um. FIGS. 21A and 22A show plan views. FIGS. 21B and 22B show cross-sectional views taken along line A–A'. FIGS. 21C and 22C show cross-sectional views taken along line B–B'.

Figure 23A:
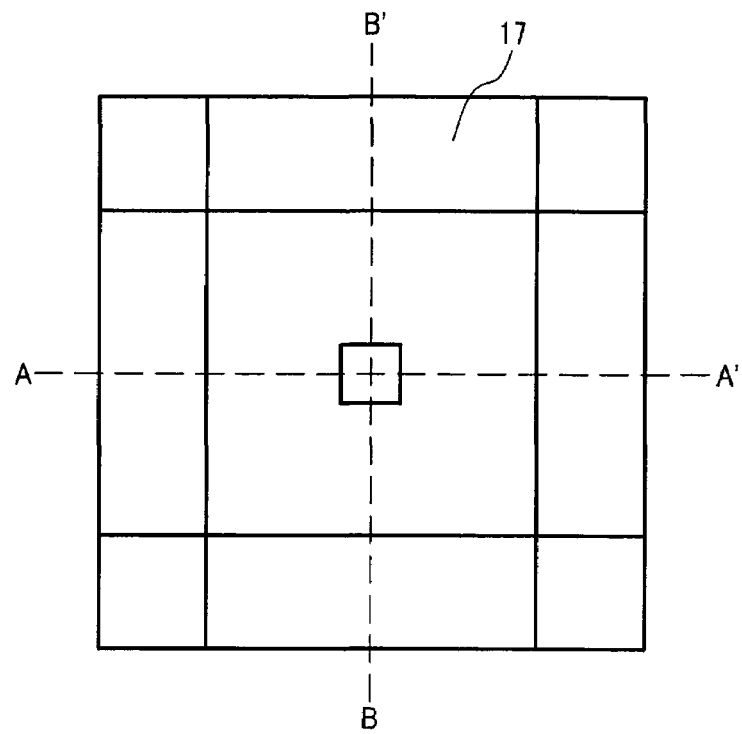
FIGS. 23A, 23B and 23C are diagrams showing a manufacturing method of the MIM type electron source according to the present invention.
Figure 23B:
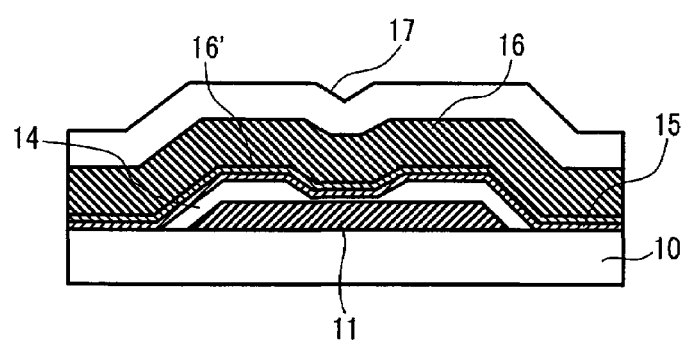
Figure 23C:
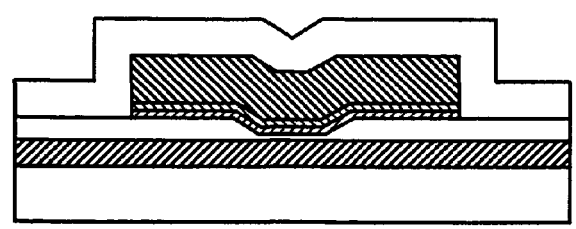
Figure 24A:
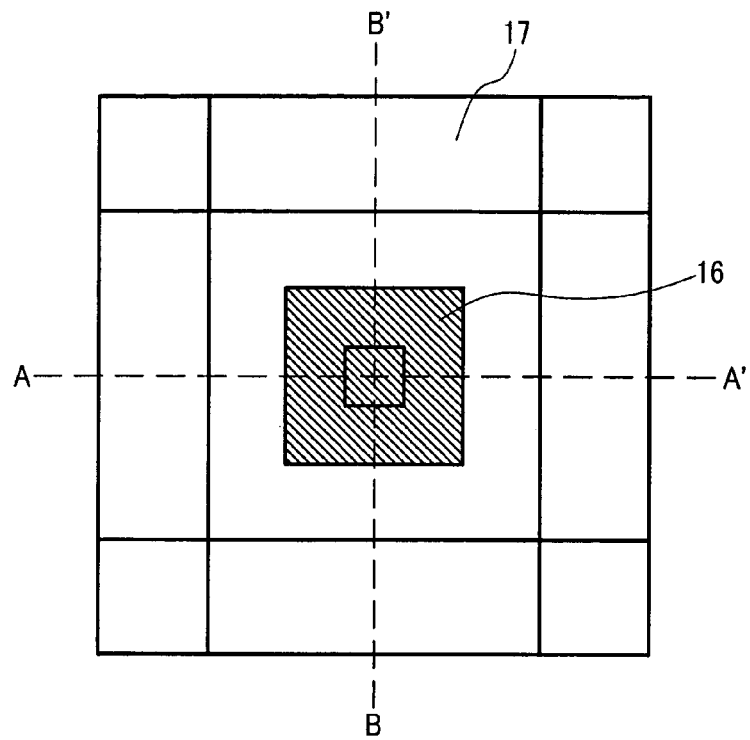
FIGS. 24A, 24B and 24C are diagrams showing a manufacturing method of the MIM type electron source according to the present invention.
Figure 24B:
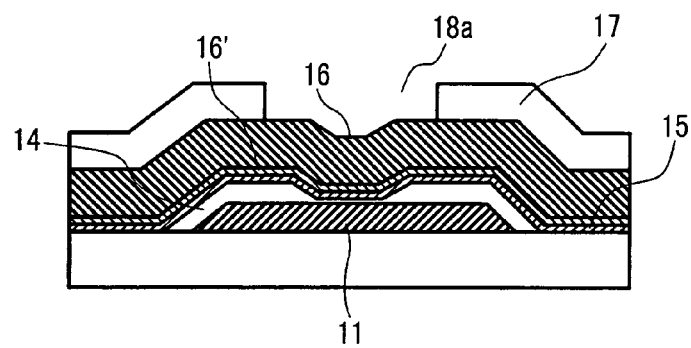
Figure 24C:
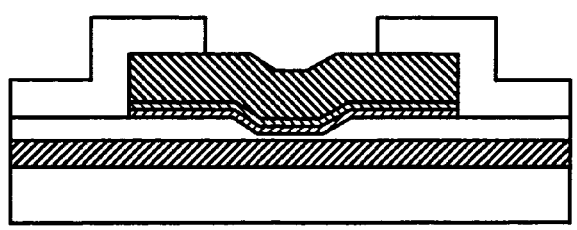

In FIGS. 23 to 24, the same procedure as that of an interlayer insulator 17 and FIGS. 8 to 9 in Embodiment 1 is followed. SiOx as the interlayer insulator 17 is deposited by sputtering. To open a later-described emission region 18, part of the interlayer insulator 17 is opened by the photolithography process and the dry etching process (an open area 18a). For the dry etching, a mixed gas of $CF_4$ and $O_2$ is suitable. FIGS. 23A and 24A show plan views. FIGS. 23B and 24B show cross-sectional views taken along line A–A'. FIGS. 23C and 24C show cross-sectional views taken along line B–B'.

In FIG. 25, the top electrode bus line upper layer 16 of the emission region 18 is removed by wet etching. The plated seed film 16' of the top electrode bus line upper layer is removed at the same time to expose the top electrode bus line lower layer 15.

In FIGS. 26 to 27, by the same method as FIGS. 11 to 12 of Embodiment 1, the top electrode bus line lower layer 15 is processed to anodic oxidize a tunneling insulator 12 again to deposit a top electrode 13.

In FIG. 26, when processing (opening) the top electrode bus line lower layer 15, in this example, W of Embodiment 1 is changed to Cr. Needless to say, the etching solution must be changed to a cerium diammonium nitrate solution for Cr.

As described above, in the electron source substrate of this example, the stacked top electrode bus line lower layer 15 and upper layer 16 are a scan line and the bottom electrode 11 is a data line. It is possible to obtain the MIM type electron source substrate having a low resistance value in which the sheet resistance of the scan line is 5 mΩ/square.

An example of a first substrate for use in the display of the present invention corresponds to the electron source substrate shown in FIG. 27. A first electrode of the first substrate corresponds to the bottom electrode 11 and a second electrode thereof corresponds to the stacked top electrode power bus line lower layer 15 and upper layer 16.

<Embodiment 4>

Figure 32A:
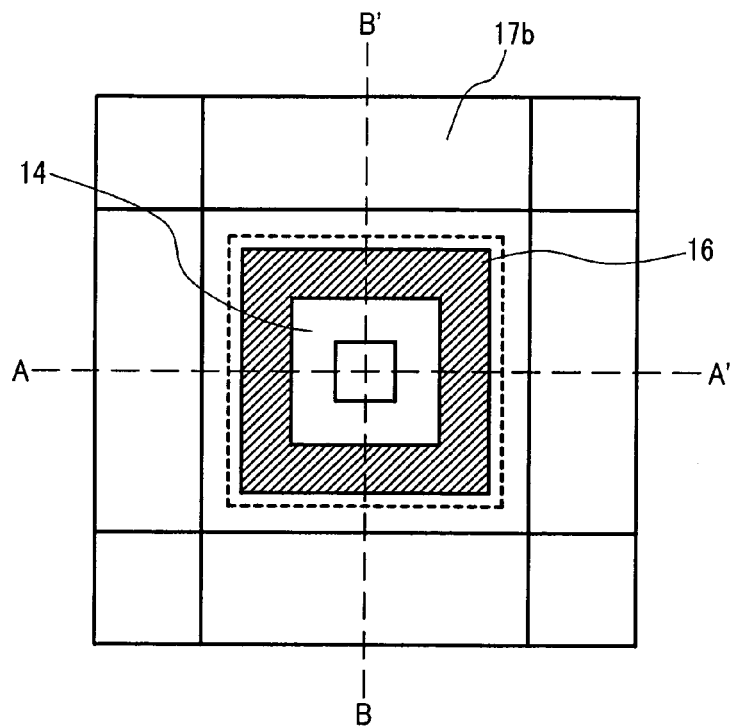
FIGS. 32A, 32B and 32C are diagrams showing a manufacturing method of the MIM type electron source according to the present invention.
Figure 32B:
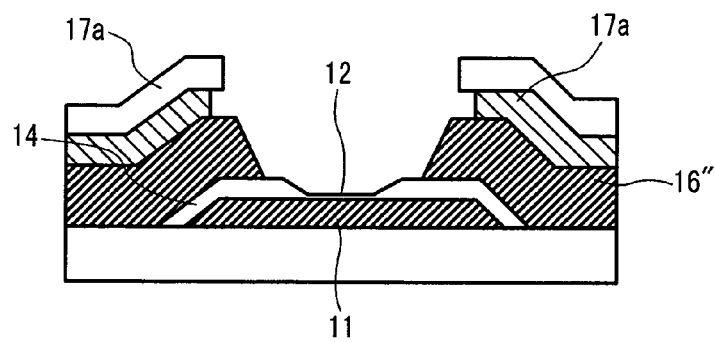
Figure 32C:
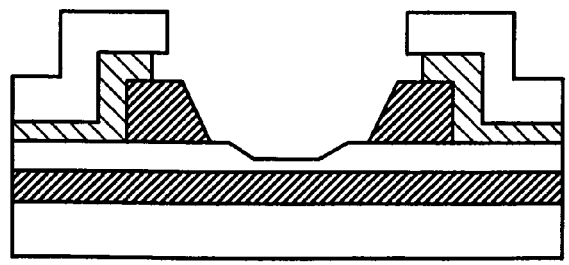
Figure 33A:
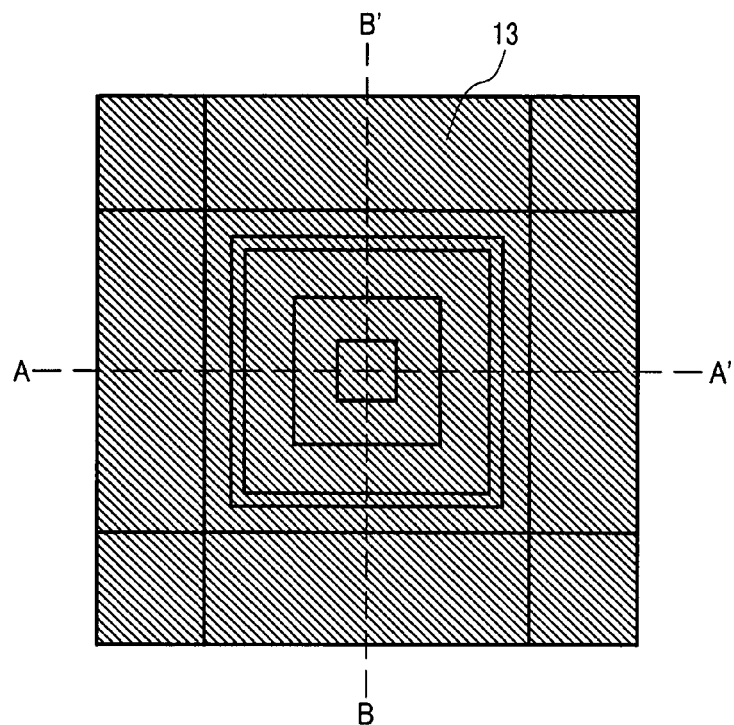
FIGS. 33A, 33B and 33C are diagrams showing a manufacturing method of the MIM type electron source according to the present invention.
Figure 33B:
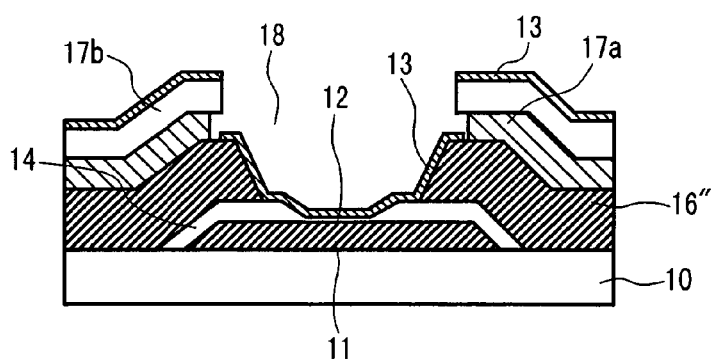
Figure 33C:
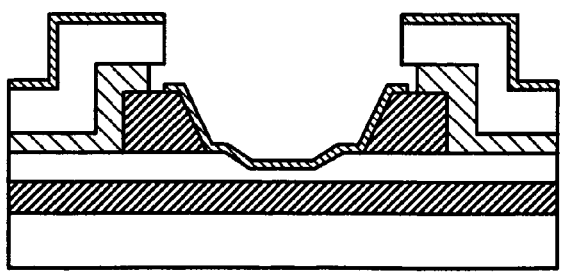

A fourth Embodiment of the present invention will be described using FIGS. 28 to 33 showing a method for manufacturing an MIM type electron source. As shown in FIG. 33 described later, there is disclosed a manufacturing method when there is not a top electrode bus line lower layer 15 and a top electrode 13 is electrically contacted with the tapered edge of a top electrode bus line 16".

Figure 28A:
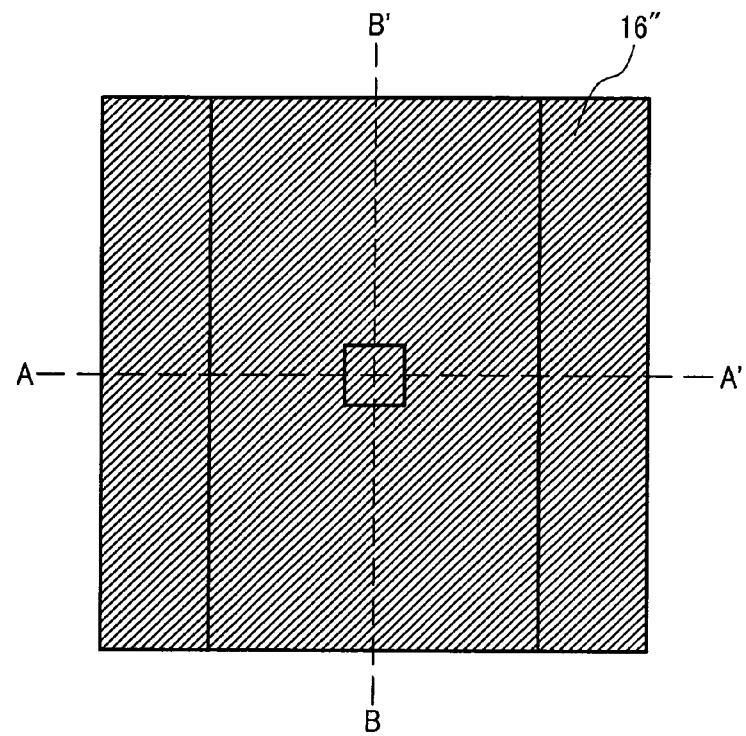
FIGS. 28A, 28B and 28C are diagrams showing a manufacturing method of the MIM type electron source according to the present invention.
Figure 28B:
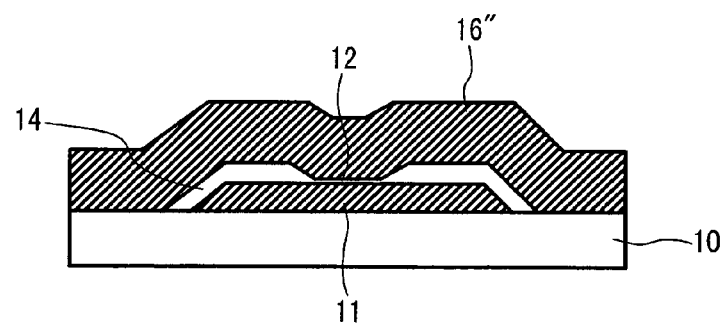
Figure 28C:
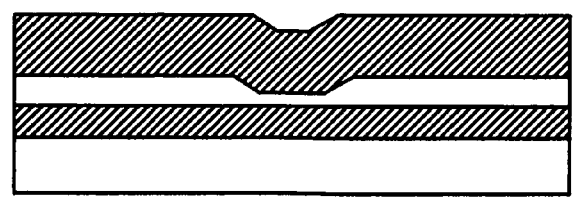

According to FIGS. 3 to 5 of Embodiment 1, a tunneling insulator 12 is formed. As shown in FIG. 28, the top electrode bus line 16" is deposited by sputtering. As the top electrode bus line 16", Al or an Al alloy shown in Embodiment 1, particularly, an Al—Nd alloy in which Nd is doped by 2 atomic weight % is preferable. The Al—Nd alloy is deposited by the sputtering method to be 5 um. The substrate temperature is set to be higher than room temperature. The grain size of the Al alloy is increased to lower the resistivity. FIG. 28A shows a plan view. FIG. 28B shows a cross-sectional view taken along line A–A'. FIG. 28C shows a cross-sectional view taken along line B–B'.

Figure 29A:
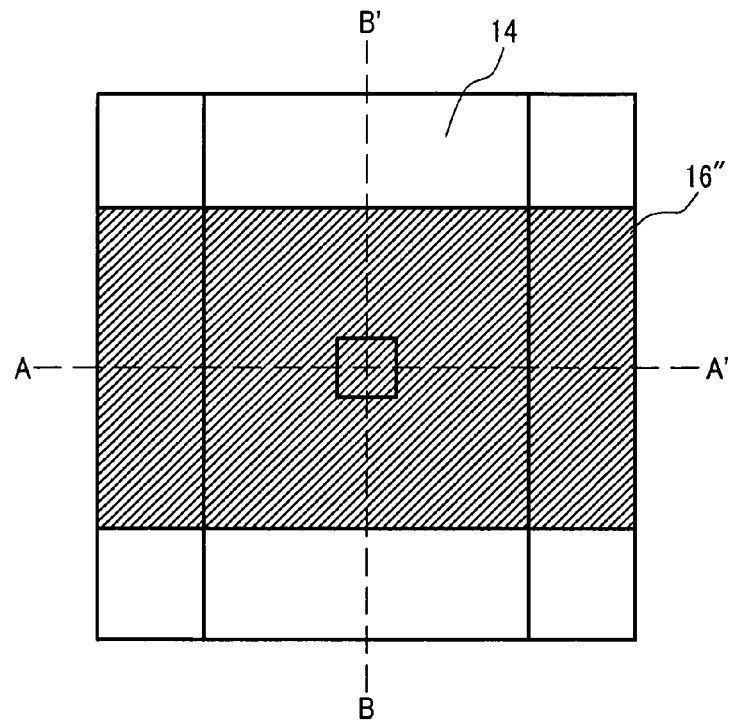
FIGS. 29A, 29B and 29C are diagrams showing a manufacturing method of the MIM type electron source according to the present invention.
Figure 29B:
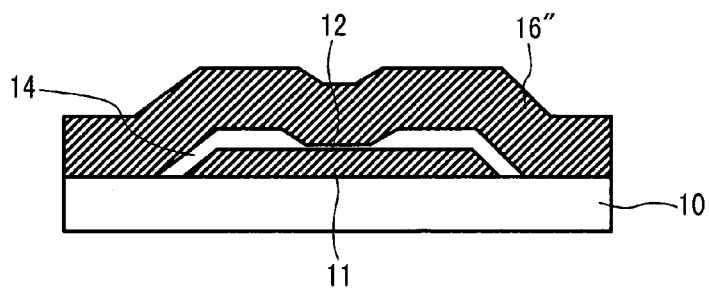
Figure 29C:
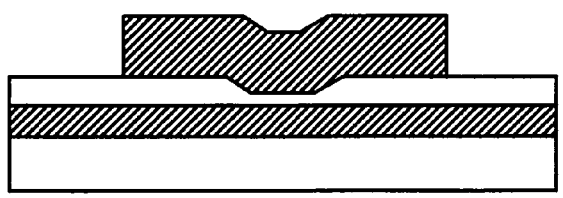

In FIG. 29, the top electrode bus line 16" is processed in a strip type in the direction orthogonal to a bottom electrode 11 by the photolithography process and the etching process. A mixed solution (PAN) of phosphoric acid, acetic acid and nitric acid is used for wet etching. FIG. 29A shows a plan view. FIG. 29B shows a cross-sectional view taken along line A–A'. FIG. 29C shows a cross-sectional view taken along line B–B'.

Figure 30A:
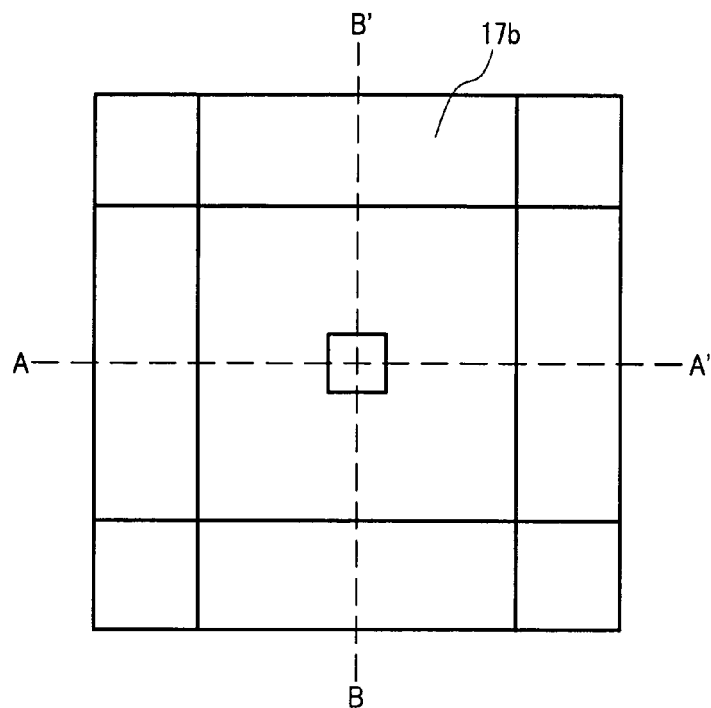
FIGS. 30A, 30B and 30C are diagrams showing a manufacturing method of the MIM type electron source according to the present invention.
Figure 30B:
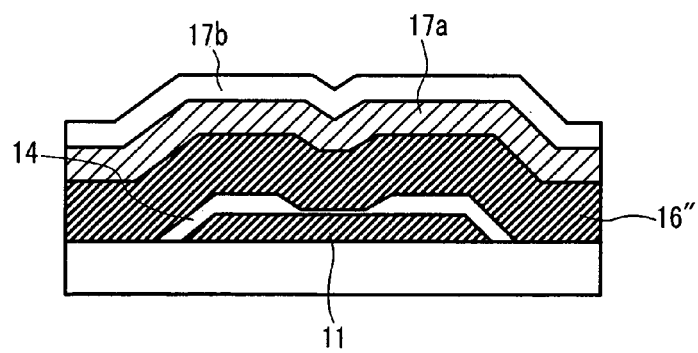
Figure 30C:
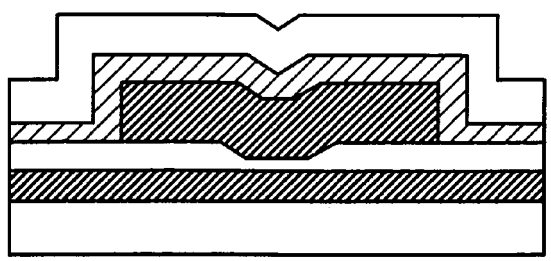

In FIG. 30, a multi layer film as an interlayer insulator 17 is deposited by sputtering. SiNx is used for an interlayer insulator lower layer 17a. SiOx is used for an interlayer insulator upper layer 17b. The film thickness is 300 nm. The interlayer insulator 17 later separates the top electrode 13 for each pixel and protects the electron source from an atmospheric pressure applied to a spacer when being pumped into a vacuum vessel. FIG. 30A shows a plan view. FIG. 30B shows a cross-sectional view taken along line A–A'. FIG. 30C shows a cross-sectional view taken along line B–B'.

Figure 31A:
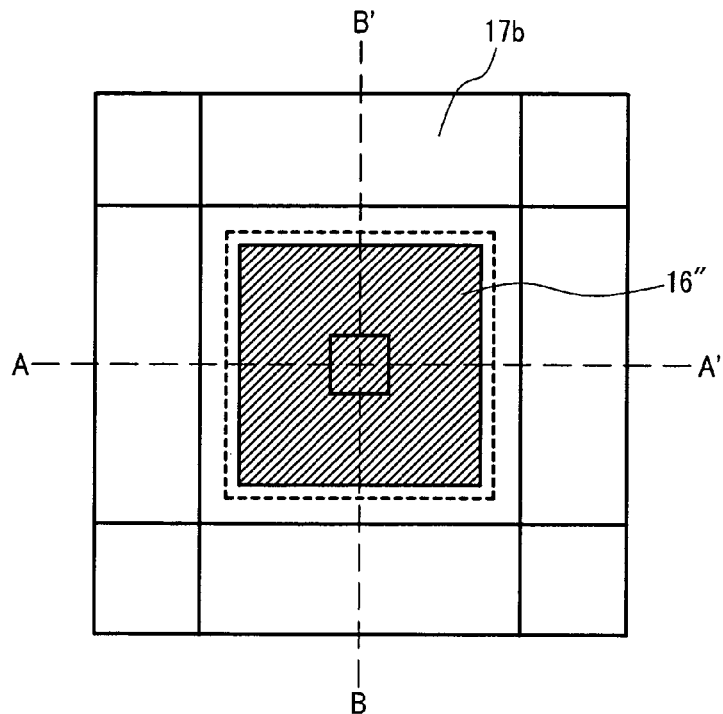
FIGS. 31A, 31B and 31C are diagrams showing a manufacturing method of the MIM type electron source according to the present invention.
Figure 31B:
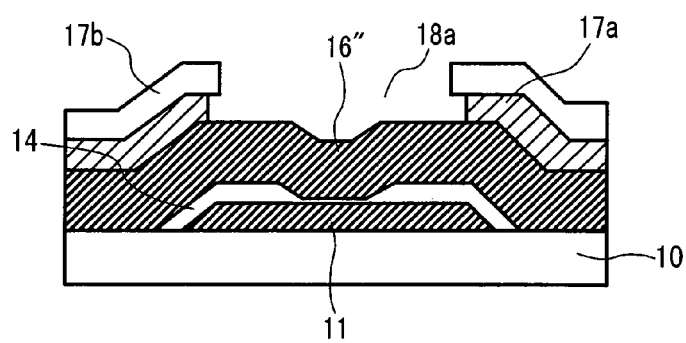
Figure 31C:
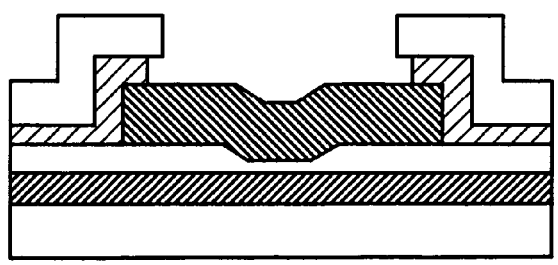

In FIG. 31, to open an emission region 18, part of the interlayer insulator is opened by photolithography and dry etching (an open area 18a). For the dry etching, a mixed gas of $CF_4$ and $O_2$ is suitable. Two films forming the interlayer insulator are etched at a different speed. The interlayer insulator lower layer 17a is subjected to larger side etching to form the same "eave" as Embodiment 1 in this part. FIG. 31A shows a plan view. FIG. 31B shows a cross-sectional view taken along line A–A'. FIG. 31C shows a cross-sectional view taken along line B–B'.

In FIG. 32, a photoresist pattern is provided by photolithography. The above PAN is used to remove the top electrode bus line 16" of the emission region 18. For electrical contact of the emission region with the later-made top electrode 13, the baking temperature of the photoresist is lowered than normal to reduce the adherability so that etching is advanced along with peeling. The edge of the top electrode bus line 16" is tapered very gently (the taper angle of below 5 degrees). The exposed tunneling insulator 12 is anodic oxidized again to recover damage due to the processing. FIG. 32A shows a plan view. FIG. 32B shows a cross-sectional view taken along line A–A'. FIG. 32C shows a cross-sectional view taken along line B–B'.

In FIG. 33, the top electrode layer 13 is formed to complete the electron source substrate. The top electrode 13 is deposited by sputtering. As the top electrode 13, stacked layers of Ir, Pt and Au are used. The film thickness is several nm. The top electrode 13 causes poor coverage in the "eave" part to be separated for each pixel. The damage of the top electrode 13 and the tunneling insulator 12 caused by the photolithography can be prevented.

As described above, in the electron source substrate of this example, the top electrode bus line 16" is a scan line and the bottom electrode 11 is a data line. It is possible to obtain the MIM type electron source substrate having a low resistance value in which the sheet resistance of the scan line is 10 mΩ/square.

An example of a first substrate for use in the display of the present invention corresponds to the electron source substrate shown in FIG. 33. A first electrode of the first substrate corresponds to the bottom electrode 11 and a second electrode thereof corresponds to the top electrode bus line 16".

<Embodiment 5>

Figure 36A:
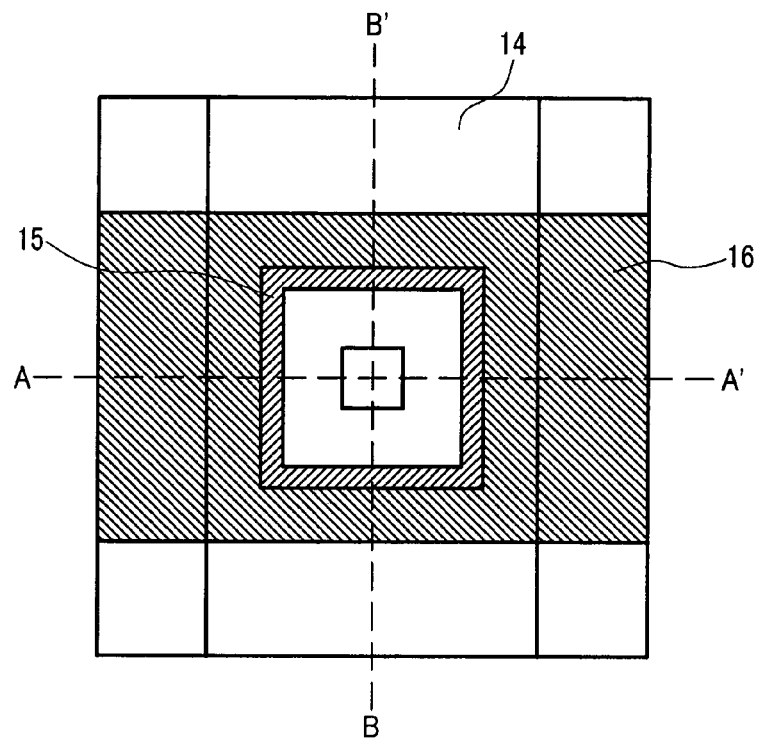
FIGS. 36A, 36B and 36C are diagrams showing a manufacturing method of the MIM type electron source according to the present invention.
Figure 36B:
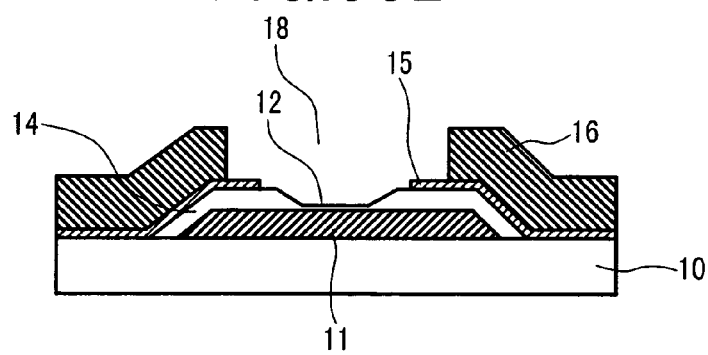
Figure 36C:
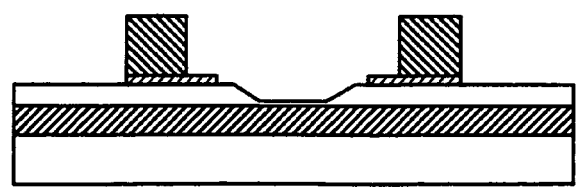
Figure 37A:
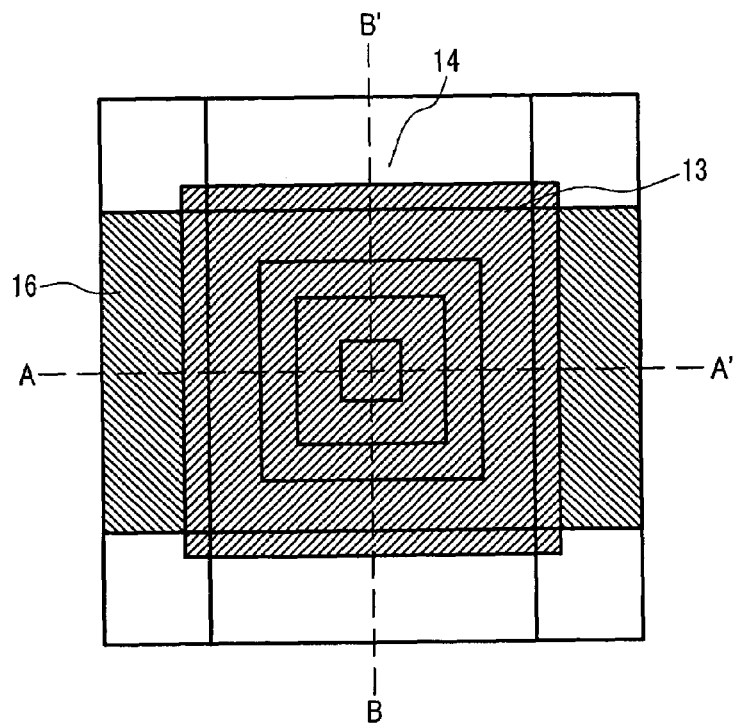
FIGS. 37A, 37B and 37C are diagrams showing a manufacturing method of the MIM type electron source according to the present invention.
Figure 37B:
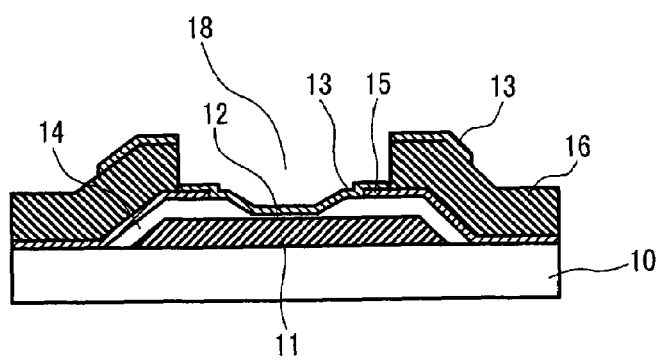
Figure 37C:
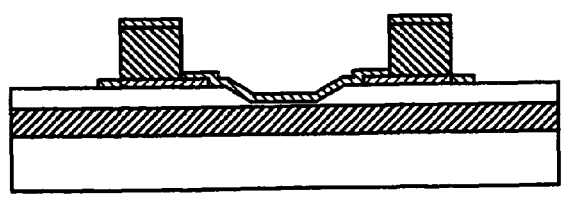

A fifth Embodiment of the present invention will be described using FIGS. 34 to 37 showing a method for manufacturing an MIM type electron source. As shown in FIG. 37 described later, there is disclosed a manufacturing method when a top electrode 13 is electrically contacted with a top electrode bus line lower layer 15 and the top electrode bus line lower layer 15 is backed by a printing material (a top electrode bus line upper layer 16) having a resistivity lower than that of a bottom electrode 11.

Figure 34A:
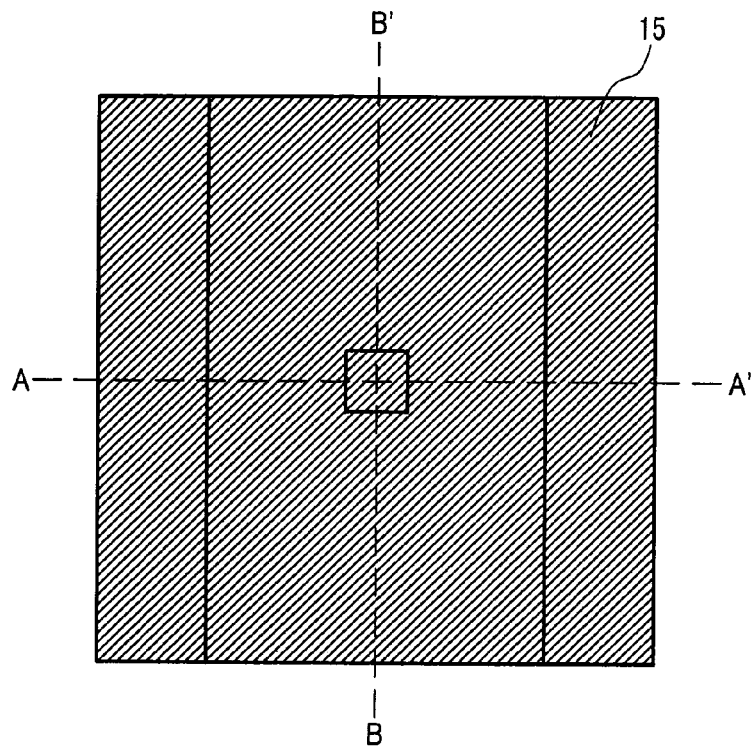
FIGS. 34A, 34B and 34C are diagrams showing a manufacturing method of the MIM type electron source according to the present invention.
Figure 34B:
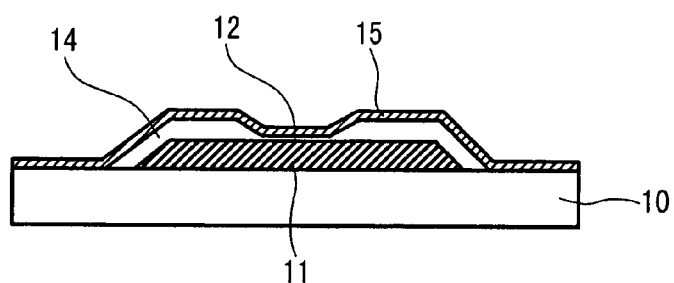
Figure 34C:
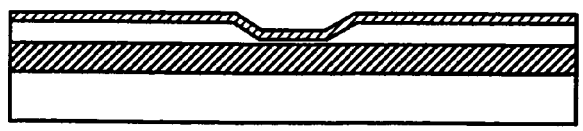

According to FIGS. 3 to 5, a tunneling insulator 12 is formed. As shown in FIG. 34, the top electrode bus line lower layer 15 is deposited by sputtering. As the material of the top electrode bus line lower layer 15, a noble metal or a high melting point metal is preferable to prevent oxidation by a calcination process of a printing material. W is selected here. Its film thickness is set to be about several 10 nm to form the same reason as that of W of Embodiment 1. FIG. 34A shows a plan view. FIG. 34B shows a cross-sectional view taken along line A–A'. FIG. 34C shows a cross-sectional view taken along line B–B'.

Figure 35A:
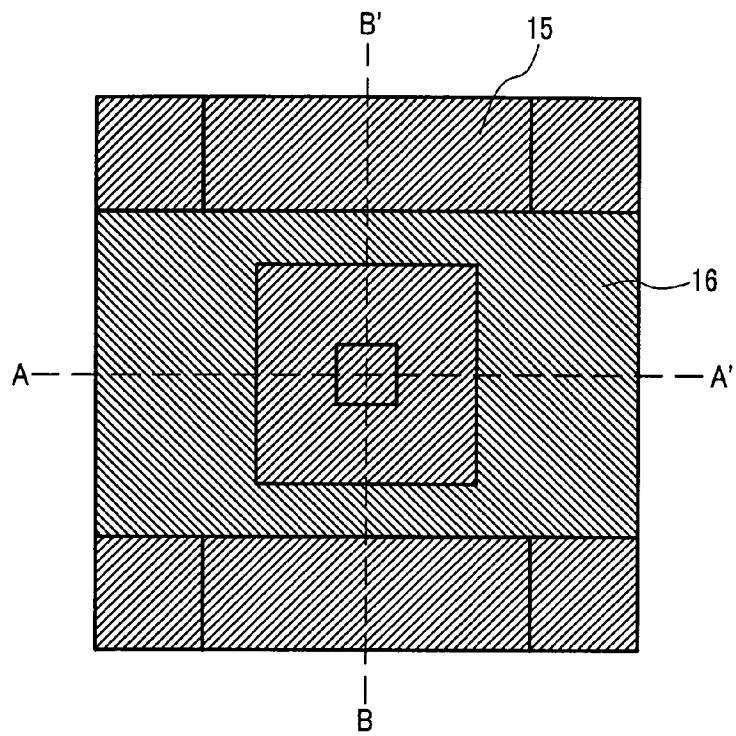
FIGS. 35A, 35B and 35C are diagrams showing a manufacturing method of the MIM type electron source according to the present invention.
Figure 35B:
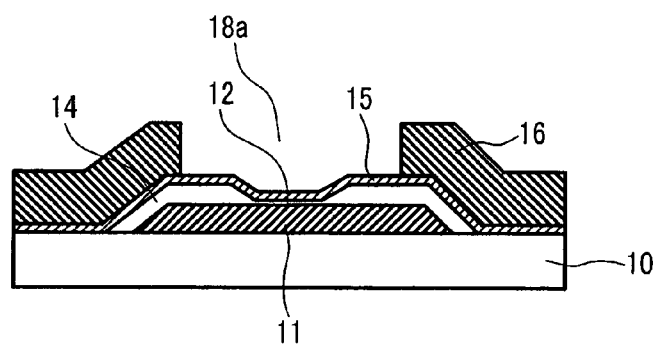
Figure 35C:
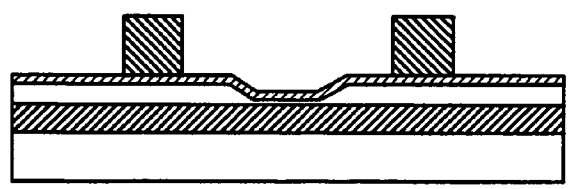

In FIG. 35, the top electrode bus line upper layer 16 is printed by a screen printing method and an ink jet method. A photosensitive or non-photosensitive material may be used. A material which can be calcined at the minimum temperature is preferable. A silver paste is selected here. Its film thickness is set to be 10 um (For appearance, the thickness is small in the drawing.). After completion of the printing, calcination is performed under predetermined conditions (420° C., in an atmosphere, and 10 min). FIG. 35A shows a plan view. FIG. 35B shows a cross-sectional view taken along line A–A'. FIG. 35C shows a cross-sectional view taken along line B–B'.

In FIG. 36, part of the W film of the top electrode bus line lower layer 15 is removed by photolithography and wet etching to expose a tunneling insulator 12. For etching of W, a mixed solution of ammonia and hydrogen peroxide is suitable. It should be noted that to secure an electrical contact of an emission region 18 with the later-made top electrode 13, the top electrode bus line lower layer 15 is processed to be projected from the top electrode bus line upper layer 16. The exposed tunneling insulator 12 is anodic oxidized again to recover damage due to the processing. FIG. 36A shows a plan view. FIG. 36B shows a cross-sectional view taken along line A–A'. FIG. 36C shows a cross-sectional view taken along line B–B'.

In FIG. 37, the top electrode layer 13 is formed to complete the electron source substrate. The electrode is deposited by sputtering. As the top electrode 13, stacked layers of Ir, Pt and Au are used. The film thickness is several nm. The electrode is separated for each pixel using a shadow mask. The damage of the top electrode and the tunneling insulator 12 caused by the photolithography can be prevented.

As described above, in the electron source substrate of this example, the top electrode bus line lower layer 15 and upper layer 16 are a scan line and the bottom electrode 11 is a data line. It is possible to obtain the MIM type electron source substrate having a low resistance value in which the sheet resistance of the scan line is 2 mΩ/square.

An example of a first substrate for use in the display of the present invention corresponds to the electron source substrate shown in FIG. 37. A first electrode of the first substrate corresponds to the bottom electrode 11 and a second electrode thereof corresponds to the top electrode bus line lower layer 15 and upper layer 16.

<Embodiment 6>

A method for manufacturing the entire display using an MIM type electron source substrate of Embodiment 6 will be described here. When using any of the MIM type electron source substrates of Embodiments 1 to 6, the later-described display manufacturing method is the same.

Figure 38A:
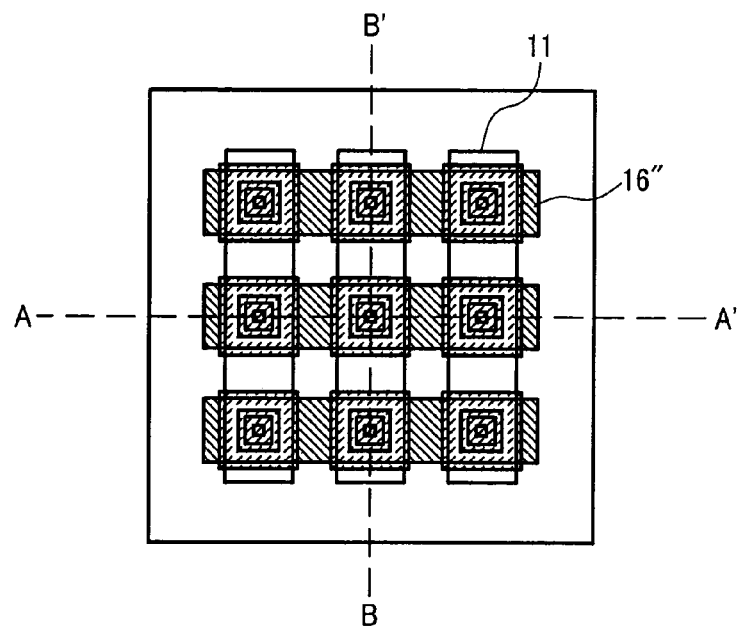
FIGS. 38A, 38B and 38C are diagrams showing a manufacturing method of a display using the MIM type electron sources according to the present invention.
Figure 38B:
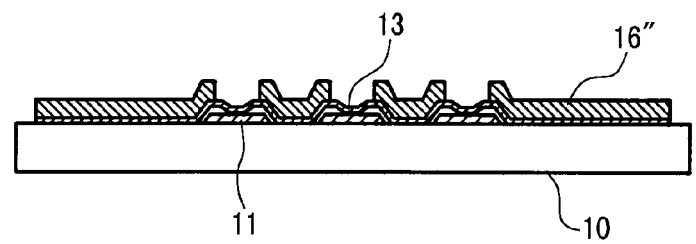
Figure 38C:
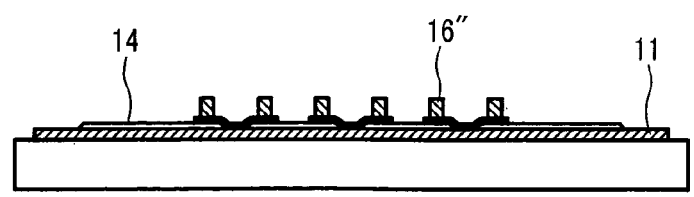

An MIM type electron source substrate is manufactured on a substrate 10 according to the method of Embodiment 6. For description, FIG. 38 shows an example of a (3×3) dot-MIM type electron source substrate. Actually, MIM type electron source matrixes in number corresponding to the number of display dots are formed. FIG. 38A shows a plan view. FIG. 38B shows a cross-sectional view taken along line A–A'. FIG. 38C shows a cross-sectional view taken along line B–B'. Although not described in Embodiments 1 to 5, when using the MIM type electron source matrixes for the display, the electrode surfaces of the electrode edge of a bottom electrode 11 and a top electrode bus line 16" must be exposed for circuit connection.

Figure 39A:
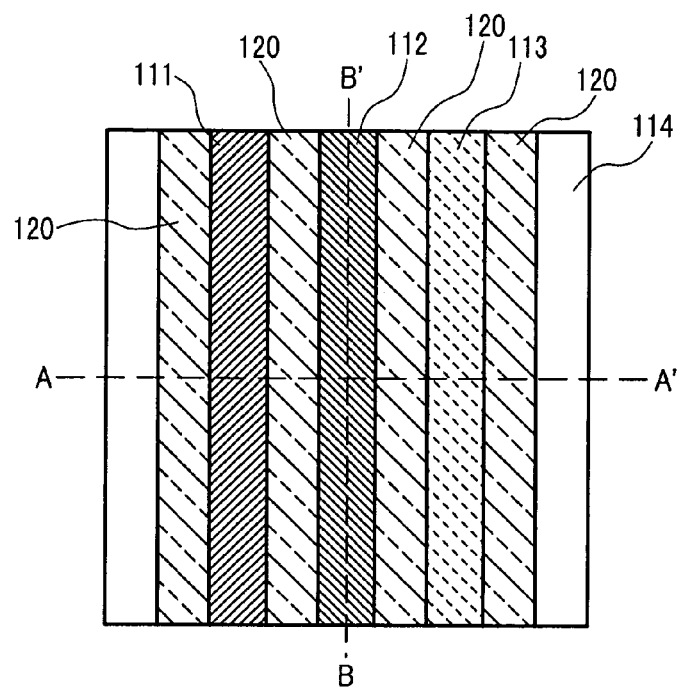
FIGS. 39A, 39B and 39C are diagrams showing a manufacturing method of a display using the MIM type electron sources according to the present invention.
Figure 39B:
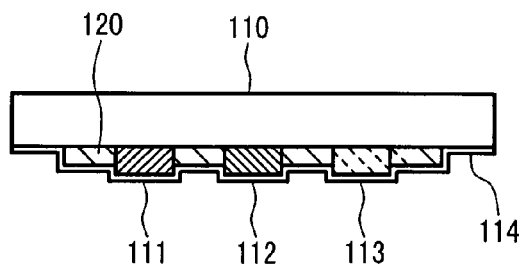
Figure 39C:

In FIG. 39, a manufacturing method of a display side substrate (called a surface plate) disposed opposite the electron source substrate as the display will be described. FIG. 39A shows a plan view. FIG. 39B shows a cross-sectional view taken along line A–A'. FIG. 39C shows a cross-sectional view taken along line B–B'.

A light-transmitting glass is used for a surface plate 110 as the substrate. Black matrixes 120 are formed to increase the contrast of the display. The black matrixes 120 are formed in the following manner. A mixed solution of PVA (polyvinyl alcohol) and ammonium chromate is coated onto the surface plate 110. A part other than the part to form the black matrix 120 is exposed by irradiating an ultraviolet light. The unexposed part is removed. A solution prepared by dissolving a graphite powder is coated thereonto to lift-off the PVA.

A red phosphor 111 is formed. A mixed solution of PVA (polyvinyl alcohol) and ammonium chromate with a phosphor particle is coated onto the surface plate 110. A part to form the phosphor is exposed by irradiating an ultraviolet light to remove the unexposed part by running water. The red phosphor 111 is thus patterned. The pattern is formed in a stripe type as shown in FIG. 39.

In the same manner, a green phosphor 112 and a blue phosphor 113 are formed sequentially. As the phosphors, $Y_2O_2S$: Eu (P22-R) for red, ZnS: Cu, Al (P22-G) for green, and ZnS: Ag (P22-B) for blue may be used.

After filming by a nitrocellulose film, Al having a film thickness of about 75 nm is deposited onto the entire surface plate 110 to provide a metal back 114. The metal back 114 functions as an accelerating electrode. The surface plate 110 is heated to about 400° C. in an atmosphere to thermally decomposing the filming film and the organic matter such as PVA. The display side substrate is thus completed.

Figure 40A:
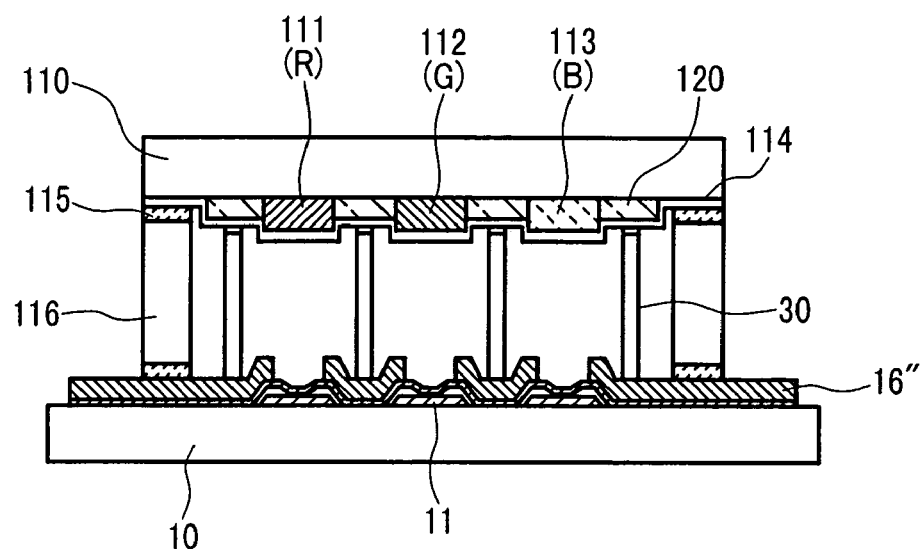
FIGS. 40A and 40B are diagrams showing a manufacturing method of a display using the MIM type electron sources according to the present invention.
Figure 40B:
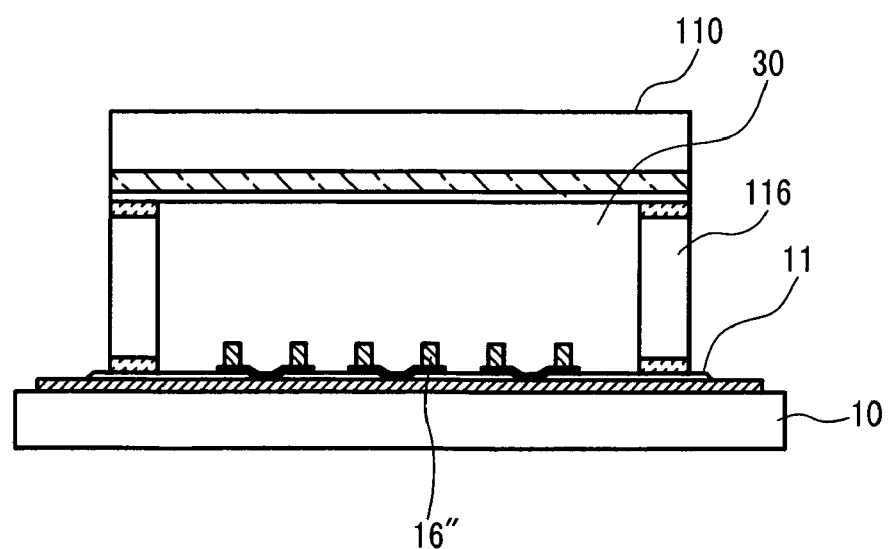

The thus-manufactured display side substrate (surface plate) 110 and the electron source substrate 10 are sealed together using peripheral frame glass 116 and flit glass 115 via spacers 30 to assemble a display panel of the display. FIG. 40A shows the part corresponding to the cross-section taken along line A–A' of the bonded display panel. FIG. 40B shows the part corresponding to the cross-section taken along line B–B' thereof. The cross-section taken along line A–A' of the display panel shows a section in the same direction as FIGS. 38A and 39A. The cross-section taken along line B–B' thereof shows a section in the same direction as FIGS. 38B and 39B.

The height of the spacer 30 is set so that the distance between the surface plate 110 and the electron source substrate 10 is about 1 to 3 mm. The plate-like glass or ceramic spacers 30 is disposed on the top electrode bus line 16". The spacer is disposed under the black matrix 120 at the display substrate side. The spacer 30 cannot inhibit emission.

For description, the spacer 30 is erected for each dot emitted in R (red), G (green) and B (blue), that is, on the top electrode bus line 16". Actually, the number (density) of the spacers 30 is reduced in the range to withstand mechanical strength. The spacers 30 may be erected every about 1 cm.

Although not described in this example, when using pillar type spacers and cross type spacers, the panel can be assembled by the same method.

The sealed panel is fully sealed by exhaustion in a vacuum of about $10^{-7}$ Torr. After the sealing, a getter is activated to maintain the inside of the panel in a high vacuum. In the case of a getter having Ba as a main constituent, a getter film can be formed by a high frequency induction heater. A non-evaporate type getter having Zr as a main constituent may also be used. The display panel using the MIM type electron source is thus completed.

In this example, the distance between the surface plate 110 and the electron source substrate 10 is long as about 1 to 3 mm. An accelerating voltage applied to the metal back 114 can be high as 1 to 10 KV. As described above, the phosphor for a cathode ray tube (CRT) can be used.

Figure 41:
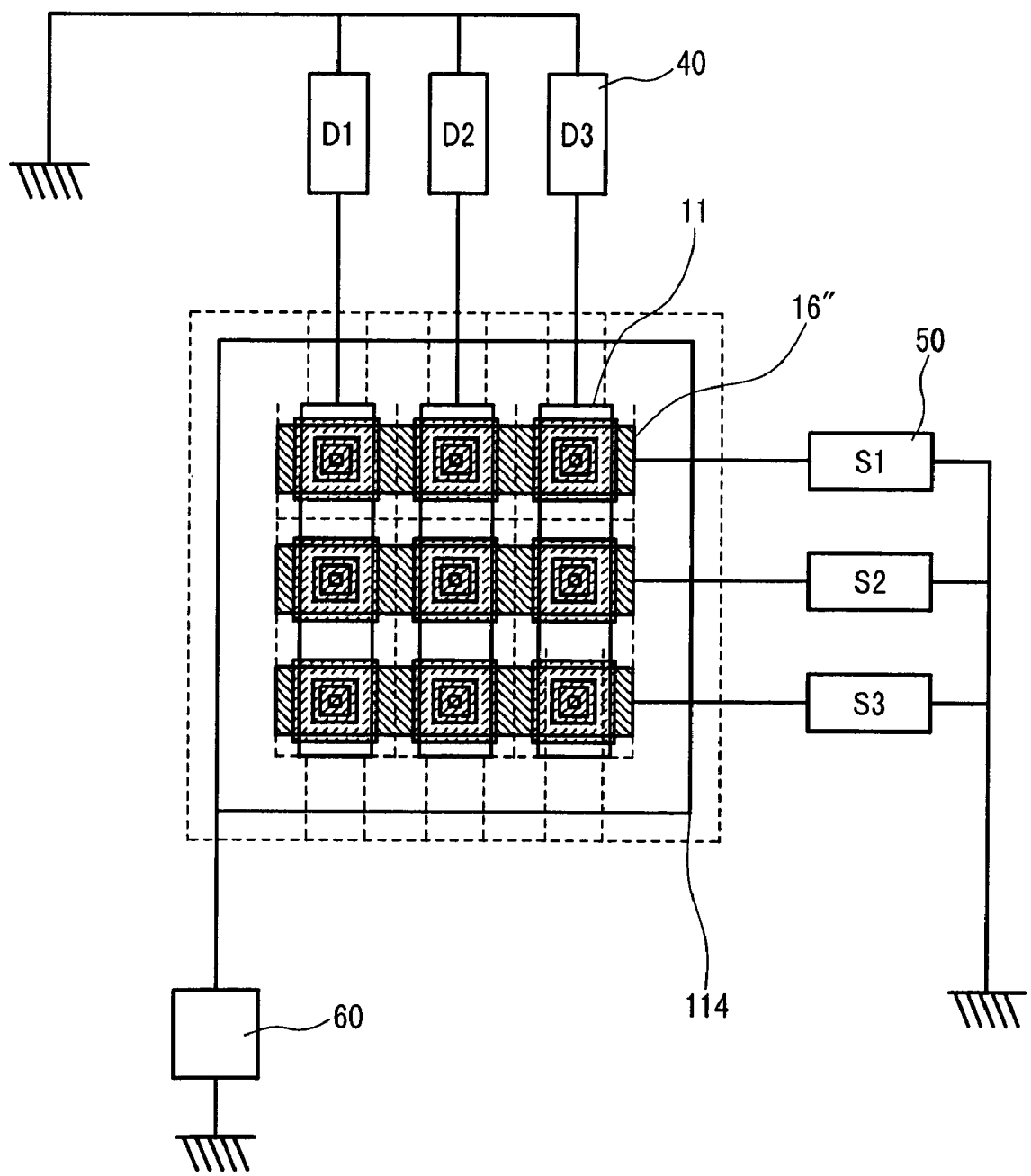
FIG. 41 is a diagram showing connection of the display using the present invention to driving circuits.

FIG. 41 is a connection diagram of the thus manufactured display panel to driving circuits. A bottom electrode 11 is connected to a data line driving circuit 40 and a top electrode bus line 16" is connected to a scan line driving circuit 50. The pixel positioned at the cross point of a scan line driving circuit Sm connected to the mth top electrode bus line 16" and a data line driving circuit Dn connected to the nth bottom electrode 11 is expressed as coordinates (m, n). A high voltage supply (power source: high voltage generating circuit) 60 of about 1 to 10 KV is always applied to the metal back 114.

Figure 42:
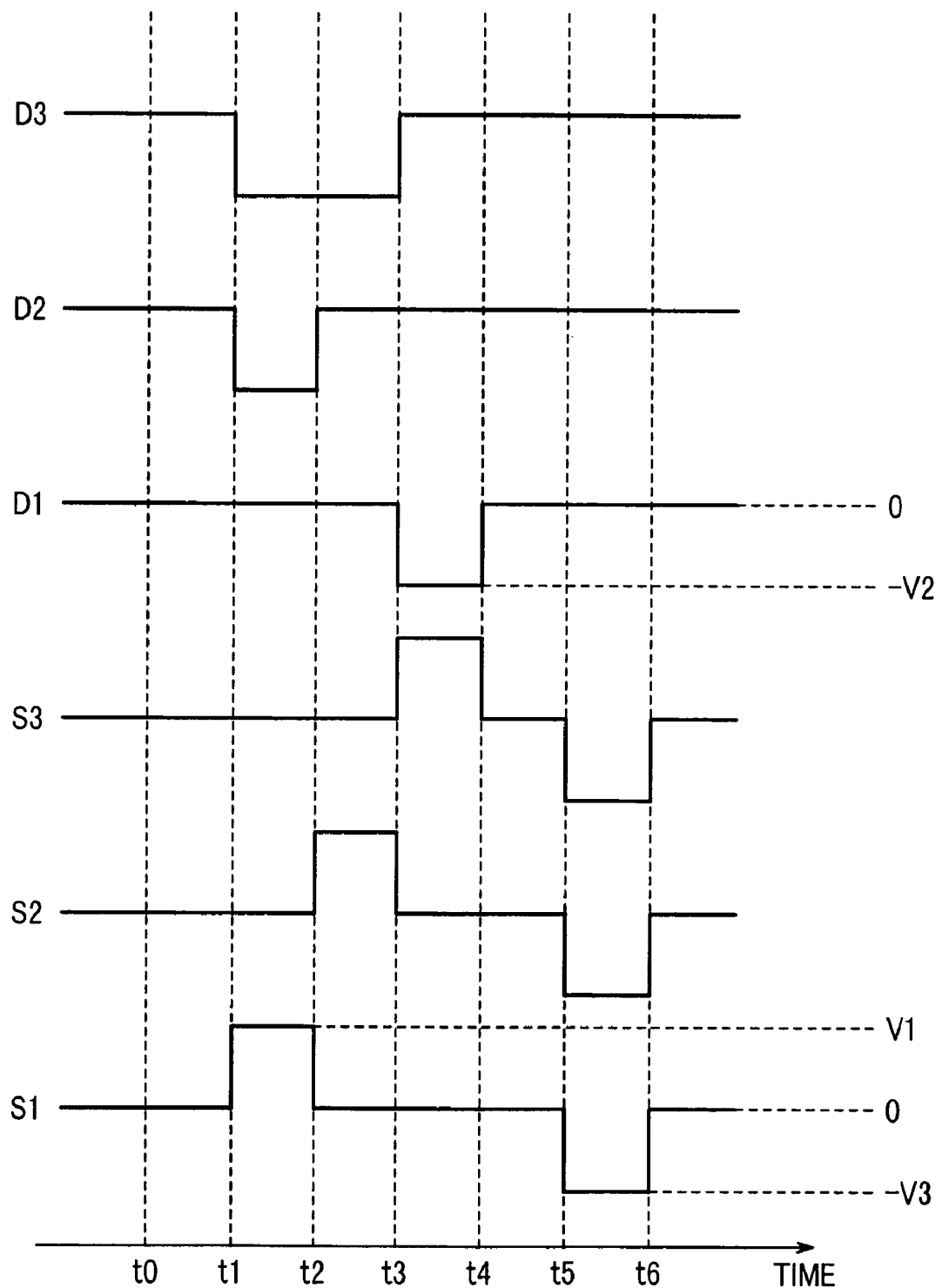
FIG. 42 is a diagram showing driving voltage waveforms in the display of the present invention.

FIG. 42 shows an example of generated voltage waveforms in the driving circuits.

At time t0, the voltage of any of the electrodes is zero. No electron is emitted so that the phosphor is not emitted.

At time t1, a V1 voltage is applied only to S1 of the top electrode bus line 16" and a −V2 voltage is applied to D2 and D3 of the bottom electrode 11. At the cross points (1, 2), (1, 3), a (V1+V2) voltage is applied between the bottom electrode 11 and the top electrode bus line 16". When the (V1+V2) is set to be above the electron emission start voltage, electrons are emitted from the MIM type electron sources into a vacuum. The emitted electrons are accelerated by the high voltage supply 60 applied to the metal back 114 and are then incident into the phosphor for emission.

At time t2, the V1 voltage is applied to S2 of the top electrode bus line 16" and the −V2 voltage is applied to D3 of the bottom electrode 11. The cross point (2, 3) is lit up.

A signal applied to the top electrode bus line 16" is changed to display a desired image or information. The −V2 voltage applied to the bottom electrode 11 is changed suitably to display an image having gray scale.

At t=t5, a reverse bias is applied to release electric charges accumulated into a tunneling insulator 12. −V3 is added to all the top electrode bus lines 16". 0V is applied to all the bottom electrodes 11 at the same time.

It is thus possible to manufacture the MIM type FED which suppresses the voltage drop amount produced in the scan line below the allowable value.

The allowable value of the voltage drop amount is not decided uniquely and can be changed under various conditions.

The evaluation reference of the poor brightness uniformity must be decided in consideration of human perception. After the voltage drop amount is corrected at the driving circuit side, driving can be made. The allowable value can be large. The sheet resistance may not be lowered correspondingly. To facilitate manufacturing and secure the yield, the film thickness of the top electrode bus line 16" should be set to be small. The above discussion will not lose generality.

The above discussion can be applied to the hot electron type electron source having an emission efficiency below 10% such as other undisclosed electron sources, for example, the MIS type and ballistic conduction (BSD) type. Of two wires forming a matrix, it is very effective that the wire which has a low sheet resistance and can easily lower the sheet resistance is decided as the scan line.

As described specifically in the above examples, the scan line is selected as the top electrode bus line. The material quality, film thickness and deposition conditions are not limited. The sheet resistance of the scan line can be lowered to 10 to several mΩ/square.

A 40 inch large screen FED is formed using the MIM type electron source. The voltage drop amount produced in the scan line can be suppressed below the allowable range. A high quality image without the poor brightness uniformity can be obtained.

What is claimed is:

1. A display comprising:
a plurality of electron sources arranged in a matrix form, each of said electron sources being provided with at least one scan line and at least one data line, wherein the plurality of data lines are arranged in a first direction, to apply a first driving voltage to the plurality of electron sources, and wherein the plurality of scan lines are arranged in a second direction crossing the first direction, to apply a second driving voltage to the plurality of electron sources, wherein the data lines and scan lines are formed on a first substrate;
a frame; and
a second substrate, having phosphor layers, coupled to the first substrate by the frame,
wherein a space surrounded by the first substrate, the frame, and the second substrate is evacuated;
wherein the plurality of scan lines are placed closer to the second substrate than the plurality of data lines are;
wherein an electron emission region of each of the plurality of electron sources has a first layer adjacent to the space;
wherein each of the plurality of scan lines comprises a second layer, a thickness of the second layer being thicker than a thickness of the data lines;
wherein the first layer is formed to cover a part of a third layer and
the second layer covers another part of the third layer so that the third layer connects the first layer and the second layer,
wherein the third layer is thicker than the first layer;
wherein the second layer is thicker than third layer; and
wherein the scan lines are driven by line sequential scanning.

2. A display according to claim 1,
wherein a sheet resistance of the plurality of the scan lines is smaller than a sheet resistance of the plurality of the data lines.

3. A display according to claim 1,
wherein the first layer is formed above the plurality of data lines.

4. A display according to claim 1,
wherein the plurality of electron sources are either surface conduction type electron sources or MIM type electron sources.

5. A display according to claim 1,
wherein the plurality of data lines are formed on a surface of the first substrate; and
wherein the first substrate is an insulating substrate.

6. A display according to claim 1,
wherein the plurality of scan lines are formed above the data lines.

7. A display comprising:
a plurality of electron sources arranged in a matrix form, each of said electron sources being provided with at least one scan line and at least one data line, wherein the plurality of data lines are arranged in a first direction, to apply a first voltage to the plurality of electron sources, wherein the plurality of scan lines are arranged in a second direction intersecting the first direction, to apply a second voltage to the plurality of electron sources, and wherein the data lines and scan lines are formed on a first substrate;
a frame; and
a second substrate, having phosphor layers, coupled to the first substrate by the frame,
wherein a space surrounded by the first substrate, the frame, and the second substrate is evacuated;
wherein the plurality of scan lines are placed closer to the second substrate than the data lines are;
wherein an electron emission region of the electron sources comprises a first layer adjacent to the space;
wherein the plurality of scan lines are each comprised of a second layer thicker than the data lines, and a third layer arranged closer to the first substrate than the second layer is;
wherein the third layer is thicker than the first layer;
wherein the second layer is thicker than the third layer;
wherein the third layer is arranged to be projected from the second layer;
wherein the first layer covers a part of the projected area of the third layer; and
wherein the scan lines are driven by line sequential scanning.

8. A display according to claim 7,
wherein a sheet resistance of the scan lines is smaller than a sheet resistance of the data lines.

9. A display according to claim 7,
wherein the first layer is formed above the data lines.

10. A display according to claim 7,
wherein the plurality of the data lines are formed on a surface of the first substrate; and
wherein the first substrate is an insulating substrate.

11. A display according to claim 7,
wherein the plurality of the scan lines are formed above the data lines.

12. A display according to claim 7,
wherein the electron sources are either surface conduction type electron sources or MIM type electron sources.

* * * * *